United States Patent [19]

Purves

[11] Patent Number: 5,145,130

[45] Date of Patent: Sep. 8, 1992

[54] ROBOT SERVICED SPACE FACILITY

[75] Inventor: Lloyd R. Purves, Silver Spring, Md.

[73] Assignee: The United States of America as represented by the Administrator of the National Aeronautics & Space Administration, Washington, D.C.

[21] Appl. No.: 781,625

[22] Filed: Oct. 23, 1991

[51] Int. Cl.$^5$ .............................................. B64G 1/10
[52] U.S. Cl. ................................... 244/159; 244/161; 901/1
[58] Field of Search ................... 244/158 R, 159, 160, 244/161, 172; 901/29, 15, 47; 414/729, 735

[56] References Cited

U.S. PATENT DOCUMENTS

| | | | |
|---|---|---|---|
| 4,334,816 | 6/1982 | Slysh | 414/10 |
| 4,384,692 | 5/1983 | Preukschat | 244/158 R |
| 4,579,302 | 4/1986 | Schneider et al. | 244/159 |
| 4,585,388 | 4/1986 | Gossain et al. | 901/1 |
| 4,667,907 | 5/1987 | Hujsak et al. | 244/158 R |
| 4,676,142 | 6/1987 | McCormick et al. | 901/29 |
| 4,715,566 | 12/1987 | Nobles | 244/159 |
| 4,738,583 | 4/1988 | Macconochie et al. | 901/1 |
| 4,772,175 | 9/1988 | Grimaldi | 414/689 |
| 4,807,834 | 2/1989 | Cohen | 244/159 |
| 4,834,325 | 5/1989 | Faget et al. | 244/158 R |
| 4,872,625 | 10/1989 | Filley | 244/159 |
| 4,878,637 | 11/1989 | Mullen | 244/159 |
| 4,964,062 | 10/1990 | Ubhayaker et al. | 364/513 |
| 5,086,999 | 2/1992 | Mullen | 244/159 |

Primary Examiner—Joseph F. Peters, Jr.
Assistant Examiner—Anne E. Bidwell
Attorney, Agent, or Firm—Paul S. Clohan, Jr.; R. Dennis Marchant; Guy M. Miller

[57] ABSTRACT

A robot serviced space facility includes multiple modules which are identical in physical structure, but selectively differing in function and purpose. Each module includes multiple like attachment points which are identically placed on each module so as to permit interconnection with immediately adjacent modules. Connection is made through like outwardly extending flange assemblies having identical male and female configurations for interconnecting to and locking to a complementary side of another flange. Multiple rows of interconnected modules permit force, fluid, data and power transfer to be accomplished by redundant circuit paths. Redundant modules of critical subsystems are included. Redundancy of modules and of interconnections results in a space complex with any module being removable upon demand, either for module replacement or facility reconfiguration, without eliminating any vital functions of the complex. Module replacement and facility assembly or reconfiguration are accomplished by a computer controlled articulated walker type robotic manipulator arm assembly having two identical end-effectors in the form of male configurations which are identical to those on module flanges and which interconnect to female configurations on other flanges. The robotic arm assembly moves along a connected set or modules by successively disconnecting, moving and reconnecting alternate ends of itself to a succession of flanges in a walking type maneuver. To transport a module, the robot keeps the transported module attached to one of its end-effectors and uses another flange male configuraiton of the attached module as a substitute end-effector during walking.

34 Claims, 20 Drawing Sheets

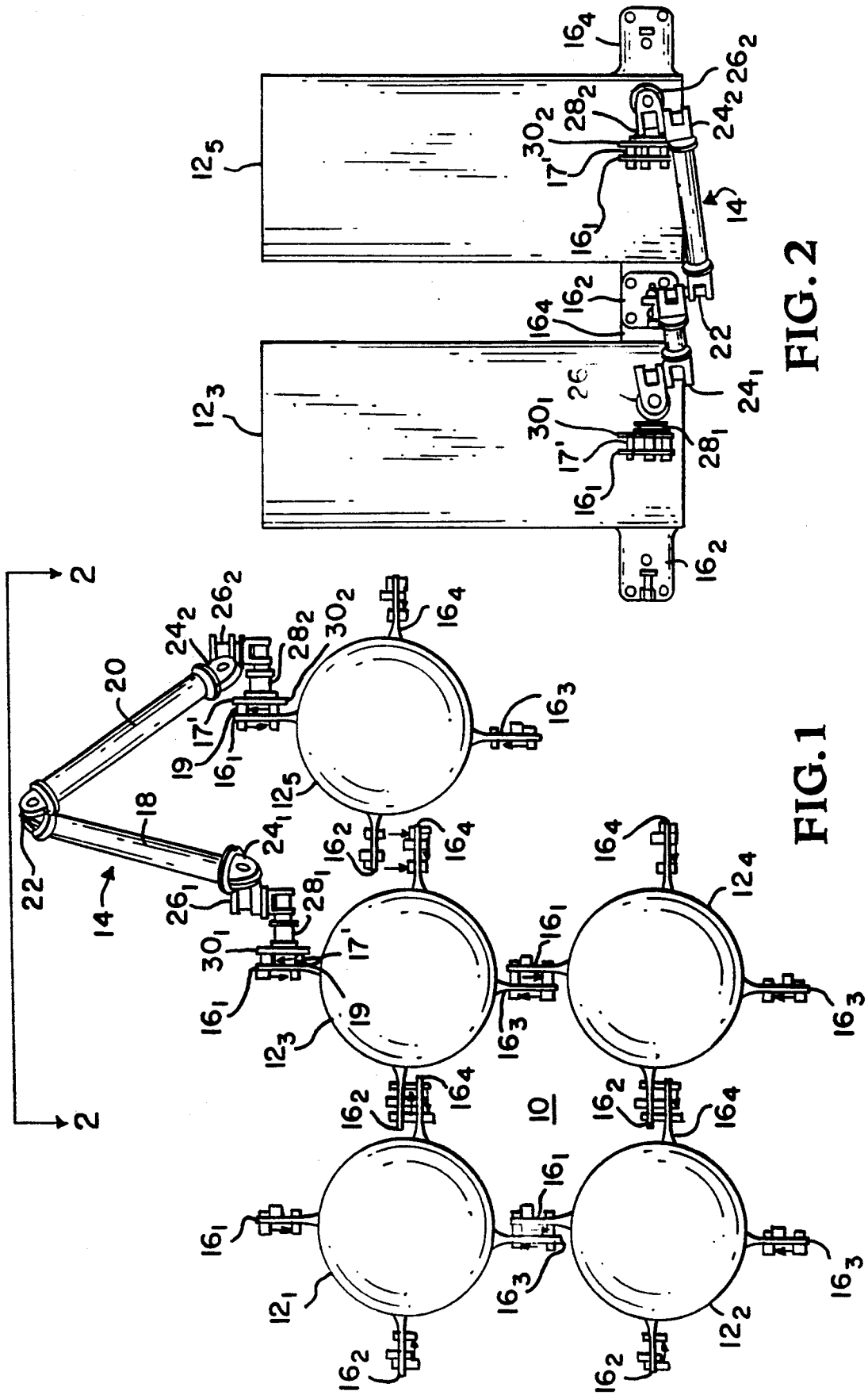

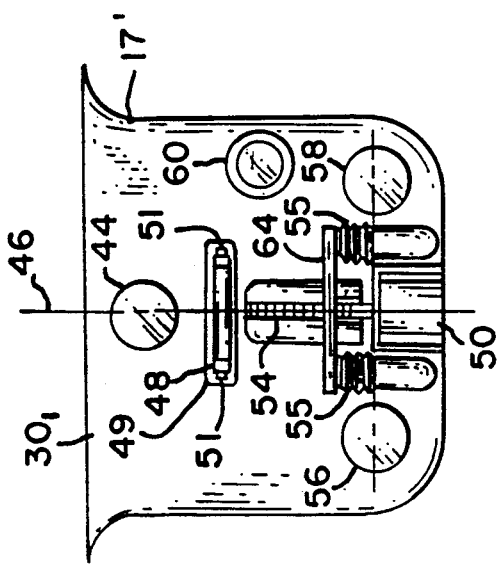
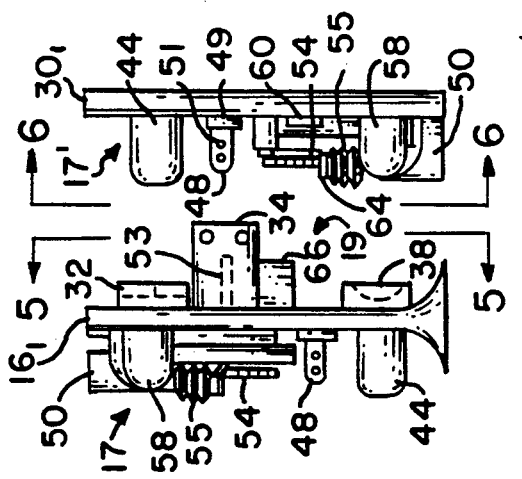
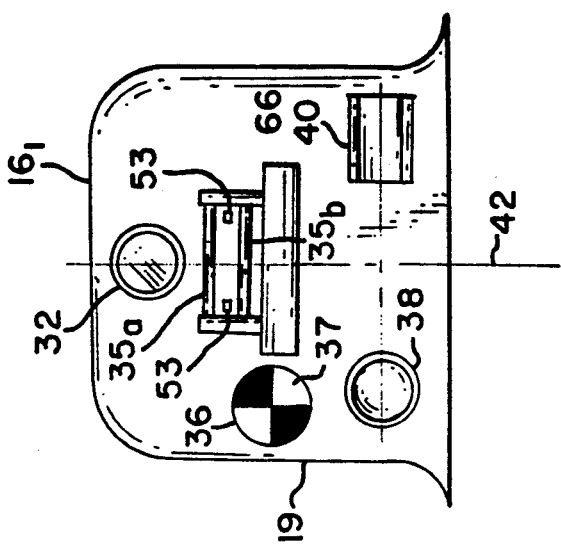
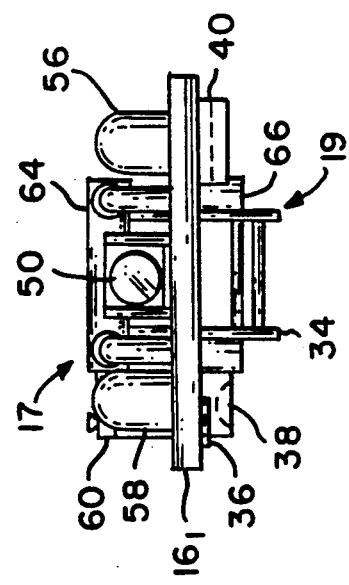
FIG. 6
FIG. 3
FIG. 4
FIG. 5

ROBOT SERVICED SPACE FACILITY

ORIGIN OF THE INVENTION

This invention was made by an employee of the U.S. Government and therefore may be made and used by or for the Government for governmental purposes without the payment of any royalties thereon or therefor.

BACKGROUND OF THE INVENTION

1. Field of the Invention

This invention relates generally to space facilities and the means of attaching and detaching components thereof, including orbiting space stations complexes located on the surfaces of planetary bodies or spaceships for interplanetary travel. More particularly, this invention is directed to a modular, robot equipped, space facility which is self-reconfiguring in that it does not require the local presence of astronauts or the like either for initial assembly or for subsequent servicing, expansion, and rearrangement. Manned versions of the invention are intended in which the self-reconfiguring capability would relieve astronauts of many assembly and servicing tasks.

2. Description of the Prior Art

The concept of space stations being comprised of identical modular units is generally well known. Their method and apparatus for assembly are also well known. In addition to assembly apparatus which includes one or more articulated manipulator arms, commonly referred to as remote manipulator systems (RMS), robotic arm systems are also known which have end-effectors at each end and move from one point to another around the structure by making end-over-end connections to successive points on the structure. While such systems are believed to operate as intended, inherent limitations nevertheless exist and are addressed with this invention.

SUMMARY

Accordingly, it is an object of the present invention to provide an improvement in the assembly and servicing of space facilities.

It is another object of the invention to provide a modular space facility with redundancy so that any one module can fail or be temporarily removed during reconfiguration without causing the loss of vital functions or features of the facility, wherein reconfiguration is defined as detaching, moving or attaching one or more space facility modules either for the purpose of module replacement or for changing the arrangement or number of modules.

It is a further object of the invention to provide an improvement in modular type space facilities wherein any module of the facility can be added or removed by a robot.

And it is yet another object of the invention to provide a robot equipped space facility so that astronaut extra vehicular activity (EVA) or human presence is not required at the facility, although the capability is implicitly provided for an astronaut to also directly control a robot as a teleoperator or even to perform module reconfiguration using EVA with appropriate tools.

And it is still a further object of the invention to provide a self-reconfiguring space facility using an autonomous robot not requiring control by either local or even remote human operators.

Briefly, the foregoing and other objects of the invention are achieved by a plurality of space station modules which are identical in physical structure, but selectively differing in function and purpose. For example, different modules are utilized for power, attitude control, command and data handling, docking and robot system control. Each module includes multiple like attachment points which are identically placed on each module so as to connect to one or more immediately adjacent modules. Connection is made through like flange assemblies having identical male and female sides comprised of like components for interconnecting to and locking to a complementary side of another flange.

With data, power, fluid, and force transferred through the connecting flanges of multiple rows of modules and with redundancy of critical modules, at least two per set of critical subsystems, the result is a space complex in which any module can be removed upon demand without eliminating any critical functions of the complex during the period while the module is removed for replacement or relocation. Therefore, the facility can be reconfigured without losing vital functions in the process.

Module assembly, rearrangement and replacement are accomplished by a robot consisting of an autonomous, computer controlled articulated walker type manipulator arm assembly having two identical end-effectors in the form of connecting mechanisms identical to those on the flanges of the modules. The robot moves along a connected set of modules by disconnecting, moving and reconnecting alternate end-effectors to a succession of flanges in a walking type maneuver. To transport a module, the robot attaches one of its end-effectors to the module using that attached module as a leg extension and employing a connecting mechanism on one of the free flanges of the transported module as the robot's second end-effector. With autonomous control of the robot, the space facility becomes capable of self-reconfiguring. When a new module is required, it is launched and sent to the complex on a vehicle that performs a rendezvous and docking operation with the space complex. For module replacement, the robot exchanges the locations of the new and old modules; and the old module can then be returned to earth on the launch vehicle that brought up the new module.

BRIEF DESCRIPTION OF THE DRAWINGS

The following detailed description of the invention will be more readily understood when considered together with the accompanying drawings in which:

FIG. 1 is an end plan view generally illustrative of a space facility in accordance with the preferred embodiment of the invention;

FIG. 2 is a top plan view of FIG. 1 taken along lines 2—2 thereof;

FIG. 3 is a side planar view of a pair of mutually engageable flange connection assemblies, located on the modules and the articulated arm assembly shown in FIG. 1;

FIG. 4 is a top planar view of the flange assembly shown to the left of FIG. 3;

FIG. 5 is a sectional view of FIG. 3 taken along the lines 5—5 thereof and being illustrative of a female side of the flange assembly illustrated to the left in FIG. 3;

FIG. 6 is a planar view taken along the lines 6—6 of FIG. 3 and being illustrative of the male side of the flange assembly shown to the right in FIG. 3;

DETAILED DESCRIPTION OF THE INVENTION

Figure 7B:
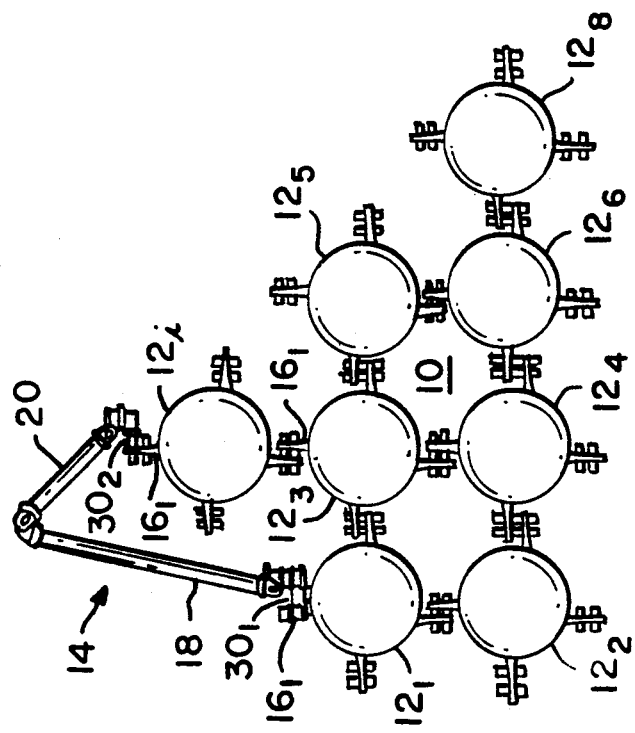
FIGS. 7A-7D are end planar views of a space facility shown in FIG. 1 and being illustrative of the transfer of a module from one side of the facility to the other in multiple steps of the articulated arm assembly illustrated therein.

The purpose of this invention is to permit the assembly and servicing of a permanent space facility to be controlled by local command and data handling apparatus so that human presence is not required at the facility. The basic operations which are to be performed at the facility include: the assembly of the space structure from equipment brought up by a sequence of launches of a rocket or shuttle, replacement of any piece of equipment thereat, expansion and reconfiguration of the facility as required to meet new requirements, and transfer of equipment from and to a launch/reentry vehicle for receiving new material and returning material to the ground.

Referring now to the drawings wherein like reference numerals refer to like components throughout, reference will be first made to FIGS. 1 and 2 wherein there is shown a self-reconfiguring space facility 10 which is comprised of a plurality of externally similar modules $12_1$, $12_2$ . . . $12_5$, the latter being a module which is being added to the facility by means of an articulated robotic manipulator arm assembly 14 which comprises a seven degree of freedom robotic walker which is able to transport itself from one module $12_1$ . . . $12_5$ to another by attaching and detaching itself sequentially to connecting flange assemblies consisting of four identical flange assemblies $16_1$, $16_2$, $16_3$ and $16_4$ for each module and which are orthogonally located at one end of a module 12 such as shown in FIG. 2. Such an arrangement is not meant to be interpreted in a limiting sense since, when desirable, any number of regularly spaced flanges, e.g. at 60° intervals as well as at both ends of the modules can be utilized as will be shown subsequently Each of the flange assemblies $16_1$ . . . $16_4$ as shown in FIGS. 3 through 6 has a male side 17 and female side 19 such as shown in FIGS. 5 and 6, with the male side 17 including an active latch mechanism, while the female side 19 includes a matching passive mating fixture, both of which will be considered hereinafter. Thus as shown in FIG. 1, the module $12_1$ is coupled to its neighbor to the right, i.e. module $12_3$ by respective flanges $16_4$ and $16_2$ and being connected to its adjoining neighbor beneath it, i.e. module $12_2$, by flanges $16_3$ and $16_1$, respectively.

Further as shown in FIG. 1, the module $12_5$ is being added to the facility 10 by means of the robotic walker arm assembly 14 by bringing flange $16_2$ of module $12_5$ into alignment with the flange $16_4$ of module $12_3$. The walker arm assembly 14 is somewhat similar to a remote manipulator system (RMS) carried in the storage bay of the well known U.S. space shuttle orbiter vehicle in that it includes two elongated independently controllable arm sections 18 and 20 which are connected via an elbow joint 22 which includes a motor and sensor assembly, not shown. The outer ends of the arm sections 18 and 20 terminate in three mutually orthogonally rotatable wrist joints $24_1$ and $24_2$, $26_1$ and $26_2$ and $28_1$ and $28_2$. Each of these wrist joints include robot wrist motors and sensors, also not shown. Additionally, the outer wrist joints $28_1$ and $28_2$ respectively terminate in latch assemblies $30_1$ and $30_2$ including male side apparatus 17' (FIG. 6) which permits attachment to any flange $16_i$ having an available female side apparatus 19 (FIG. 5). As shown in FIGS. 1 and 2, the male sides 17' of latch assemblies $30_1$ and $30_2$ are attached to the female sides 19 of the latch assembly $16_1$ of the modules $12_3$ and $12_5$.

Referring now to FIG. 3, shown thereat, for example, are the upper flange assembly $16_1$ of the module $12_3$ (FIG. 1) and the male side 17' flange assembly $30_1$ at the end of arm 18 of the robot walker 14 and is a duplicate of the male side apparatus 17 (left) of the flange assembly $16_1$, with the exception that it is inverted. The right side of the flange assembly $16_1$ constitutes the female side 19, which is further shown in FIGS. 4 and 5.

The female side 19 of the flange assembly includes a centralized upper flat circular contact area 32 below which is located a locking pin roller subassembly 34 including rollers $35_a$ and $35_b$. To the left and slightly below the subassembly 34 is a TV alignment target 36 comprised of alternating black and white target segments 37. Below the target 36 is a spherical concave contact area 38 which is accompanied by a same level cylindrical concave contact surface area 40 on the opposite side of the center line 42. This configuration faces the male side 17' of the assembly $30_1$ which is shown in FIG. 6 and is furthermore replicated on the back side of the flange assembly $16_1$ as shown in FIG. 4.

As best shown in FIG. 6, the male side apparatus 17' of a flange assembly and more particularly assembly $30_1$, includes an outwardly protruding contact member 44 near the top and which is positioned along the center line 46. The member 44, generally circular in cross section and flat on the top, is adapted to contact the flat area 32 on the female side apparatus 19 of the flange $16_1$. Directly below the male type contact member 44 is a horizontally oriented locking pin roller 48 which is adapted to fit between the locking pin rollers $35_a$ and $35_b$ of the pin roller assembly 34 shown in FIG. 5. At the base of locking pin roller 48 is a six-vector force torque sensor 49 to measure contact forces during flange mate/demate operations. Contact forces will be caused by position errors and the robot control system will adjust robot position to reduce or eliminate them. Correct mating of flanges is indicated when micro switches 51, located on the side support of locking pin roller 48, are closed by contact pins 53 on pin roller assembly 34. Directly beneath the locking pin roller 48 is a motor driven lead screw/locking pin 54 which is oriented along the center line 46. A drive motor for the member 54 is shown by reference numeral 50. On either side of the center line in the lower portion of the assembly $30_1$ are a pair of spherical type male contact surfaces 56 and 58 which are adapted to contact the concave or female contact surfaces 38 and 40 of FIG. 5. When male surfaces 44, 58 and 52 are in firm contact with female surfaces 32, 38 and 40 respectively, the result is a kinematic mount which precisely locates flange $16_1$ relative to flange $30_1$ and also accommodates material distortions by allowing contact surface 56 to move relative to contact surface 40 in one direction and contact surface 44 to move relative to contact surface 32 in two directions. At the same level as the alignment target 36 (FIG. 5), there is located a small TV camera 60 which is used together with the target 36 to align the opposing male and female sides 17' and 19 of the respective flanges $16_1$ and $30_1$.

When the two assemblies $16_1$ and $30_1$ are brought together such that their respective contact areas abut one another, the motor 50 drives the lead screw/locking pin 54 between the separated pin rollers $35_1$ and $35_b$ and the intermediate pin roller 48 to lock the two assemblies together. It should also be noted that the motor driven lead screw/locking pin 54 also carries a male type fluid and electrical power and data connector member 64 which then interconnects with a complementary or female type connector member 66 on the female side 19 (FIG. 5). Fluid lines with expansion bellows 55 permit the fluid line ends to move with locking pin 54.

Figure 12:
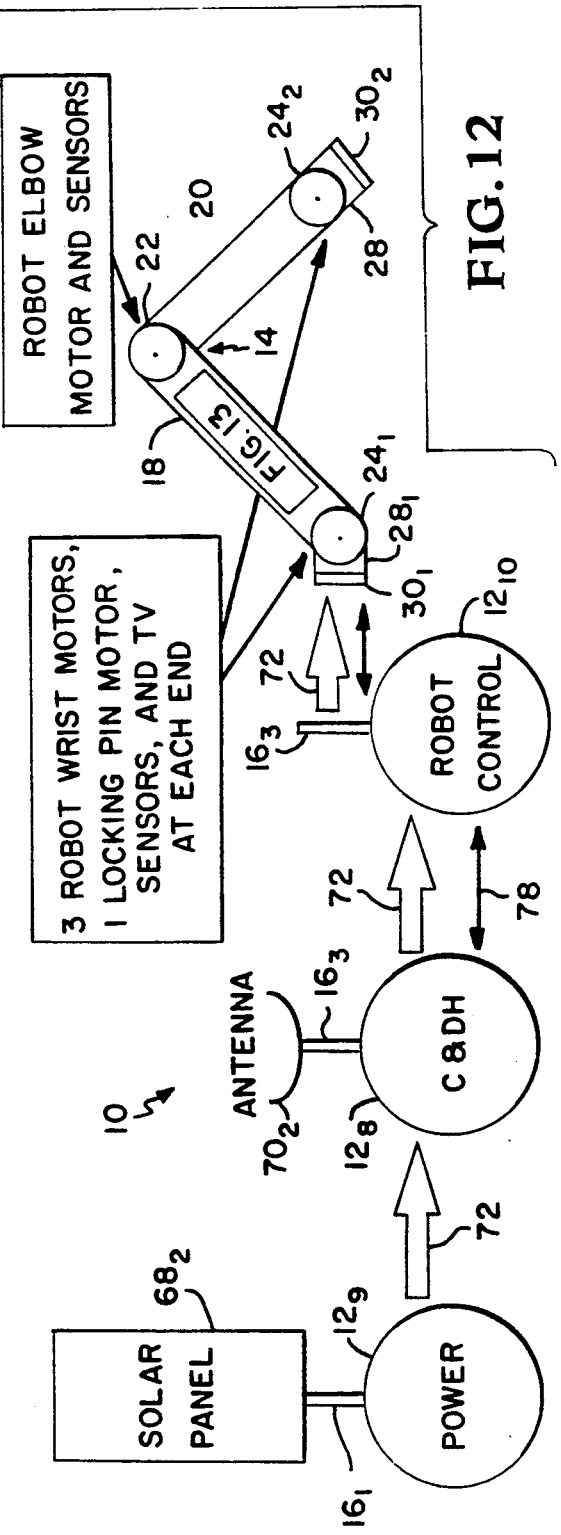
FIG. 12 is an electrical-mechanical block diagram illustrating electrical interconnection between modules and further illustrative of the details of the robot manipulator arm assembly.

It should be noted that interconnection between modules $10_1 \ldots 10_n$ takes place in exactly the same manner, so that each module $12_1 \ldots 12_5$ as shown in FIG. 1, when interconnected, has a power, data and fluid buss structure which can bidirectionally communicate with any of the other modules in the space facility 10. As shown in FIG. 1, an end module $12_5$ can move unidirectionally when mating or demating with module $12_3$. However, a module, such as $12_4$, which attaches to more than one module, in this case $12_2$ and $12_3$, must be rotated during mating and demating with its adjoining modules for the flanges to clear. Each module, however, includes computer logic to avoid communication conflicts because it can be seen that power, data and fluid can flow between modules along multiple or redundant signal paths. FIG. 12 shows how computer controlled cutoff inside a module acts to define transfer paths. Thus not only are there fluid and electrical connections between the modules $12_1 \ldots 12_5$, but the flanges $16_1 \ldots 16_1$ themselves also provide structural integrity to keep the entire assembly sufficiently stiff to provide a relatively rigid unitary structure.

Figure 7A:
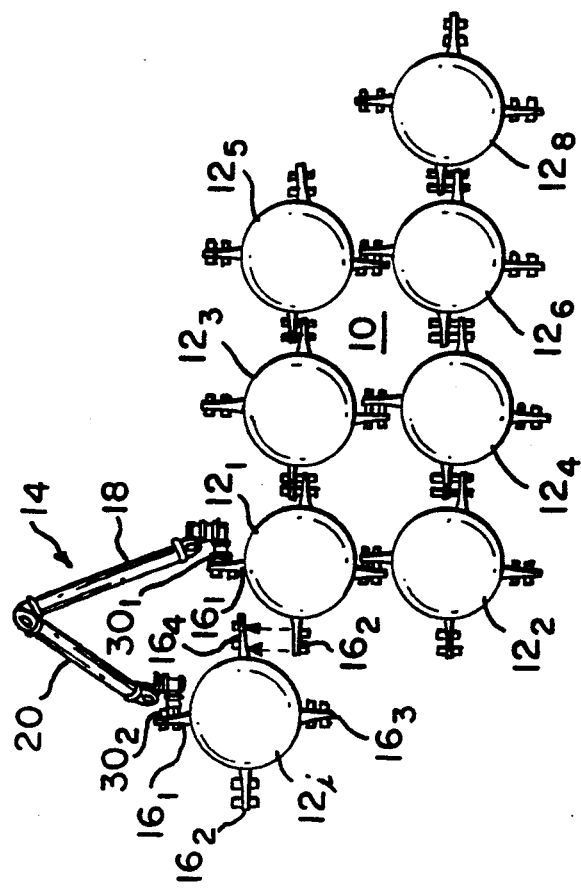
Figure 7D:
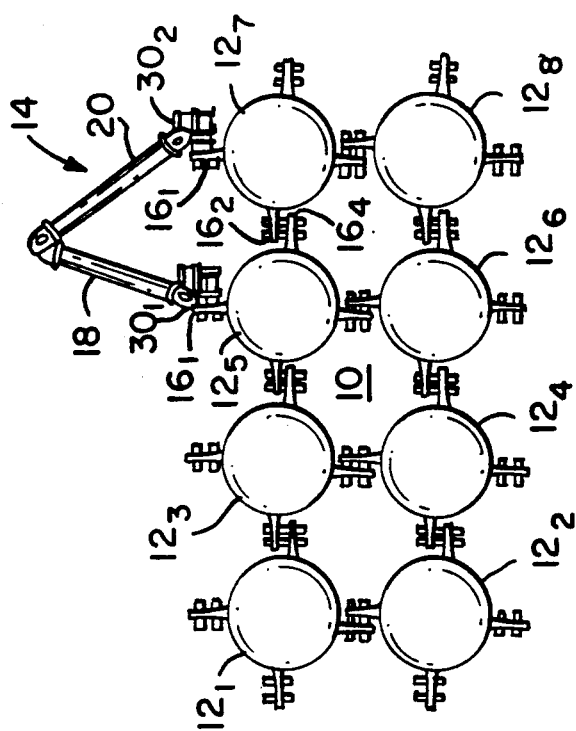

Referring now to FIGS. 7A through 7D, shown thereat is a transporting operation wherein a module $12_i$ in FIG. 7A is detached from the module $12_1$ and moved to the 7th position by the walker robot arm assembly 14 where it attaches itself to the modules $12_5$ and $12_8$ and becomes module $12_7$ as shown in FIG. 7D.

Figure 7C:
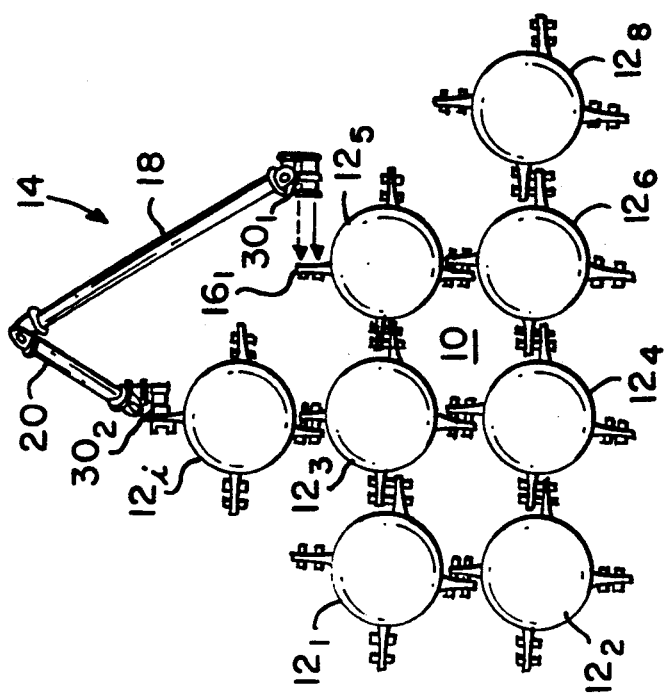

In FIG. 7A, the module $12_i$ is shown being detached from the latch assembly $16_2$ of module $12_1$. The robot arm assembly 14 is also shown attached to latch assembly $16_1$ thereof. In FIG. 7B, upon detachment of the module $12_i$, the robot arm assembly 14 rotates the module $12_i$, for example, counter-clockwise, and attaches it to latch assembly $16_1$ of module $12_3$. The arm 14 then swings around and attaches itself to the latch assembly $16_1$ of module $12_5$ as shown in FIG. 7C. Following this, the arm 14 removes the module 12 from latch assembly $16_1$ of module $12_2$ and rotates it into position as shown in FIG. 7, where it takes its place as module $12_7$. It can be seen that by a sequence of attachment and detachment maneuvers across the outer perimeter of the facility 10, the robotic arm assembly 14 can "walk" its way around the structure 10 to any desired flange location and in the process carry or remove a module autonomously, thus providing the facility 10 with a self-reconfigurable, as well as a self maintainable capability.

Figure 27:
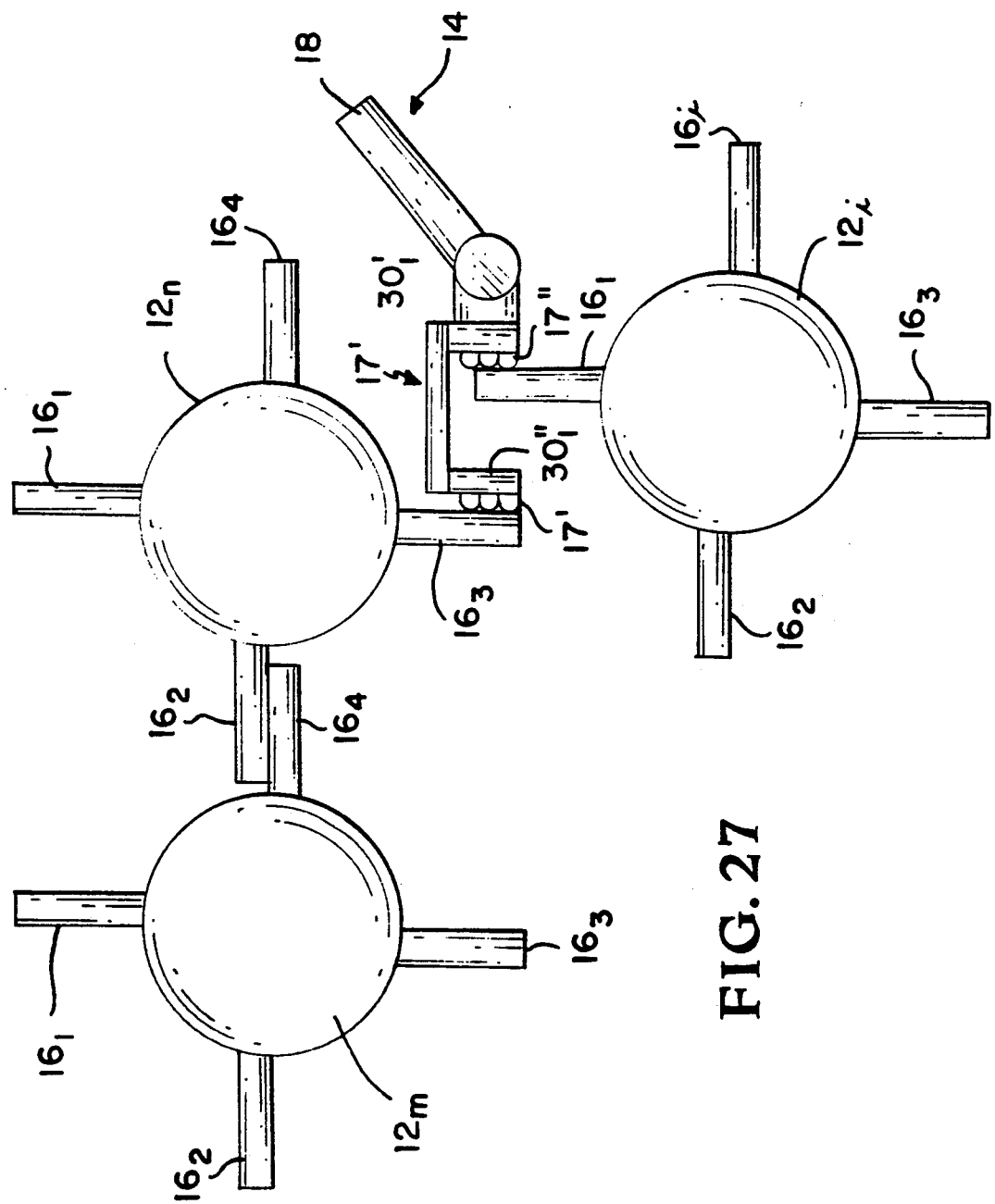
FIG. 27 is illustrative of a variation in which the robot end-effector has two male type couplings.

Should it be desired to avoid having to repeatedly connect and disconnect a module $12_i$ just to permit the robotic arm assembly 14 to walk, the end-effector 17' at the end of the arm 18, for example, can be fitted with an extension having two male couplings $30_1'$ and $30_1''$ thereupon, as shown in FIG. 27. The first male coupling $30_1'$ then holds the module $30_i$ and the second male coupling $30_1''$ acts as a foot for the robotic arm assembly 14.

Figure 8:
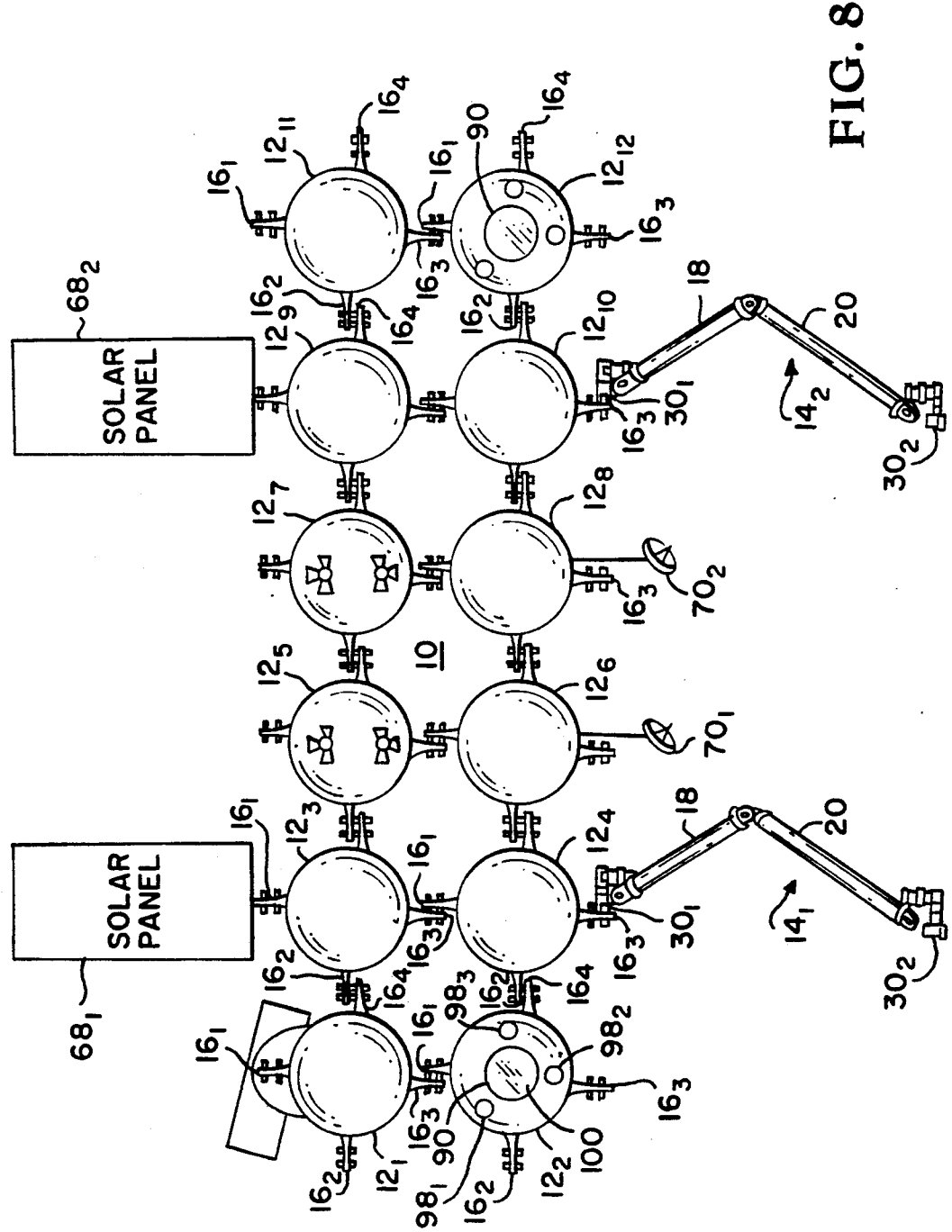
FIG. 8 is an end planar view generally illustrative of a double row space facility including redundant sets of critical modules.
Figure 28:
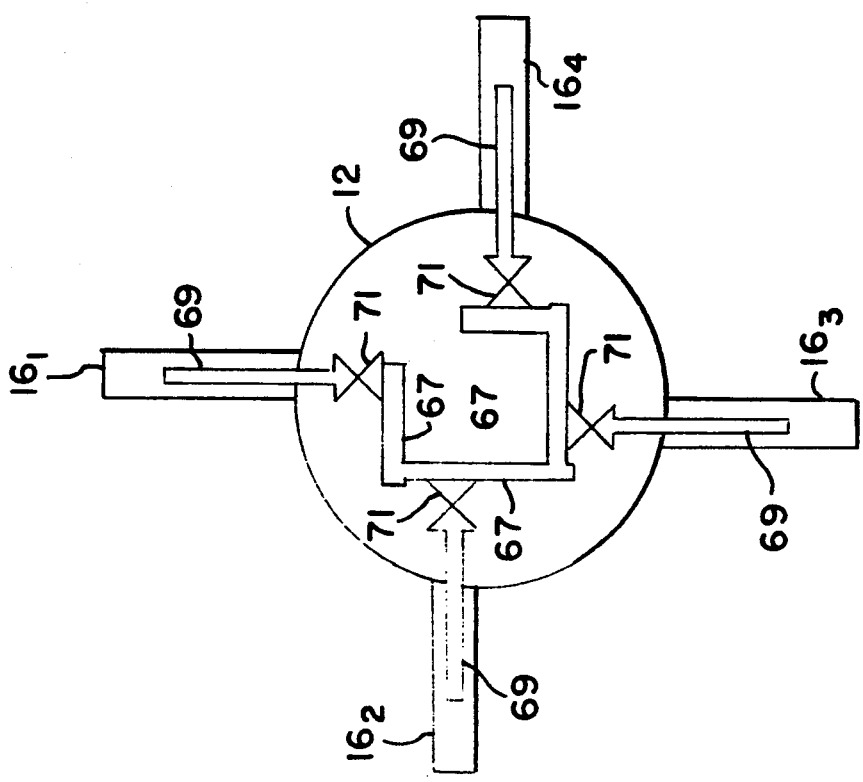
FIG. 28 is illustrative of how the cutoffs control the manner in which power, data, and fluid are routed from one flange to another inside a module.

This now leads to a consideration of FIG. 8. Shown thereat is an embodiment of the space facility 10 which is comprised of a double row of six modules $12_1, 12_2 \ldots 12_{11}$ and $12_{12}$, all having a plurality of evenly spaced latch assemblies, and more particularly four latch assemblies $16_1, 16_2, 16_3$ and $16_4$ as shown in FIG. 3 so that not only is structural support provided, but by virtue of the connector members 64 and 66 included thereon, redundant power, data and fluid paths are provided between modules $12_1 \ldots 12_{12}$. Furthermore, critical function redundancy is provided by the redundant modules used for power, attitude control, command and data handling docking, and the robotic arm systems as shown in FIG. 28 wherein reference numerals 67, 69 and 71 respectively denote: buses in the module 12 for power, data and fluid transfer; power, data and fluid lines to the flange couplings $16_1$–$16_4$; and computer controlled cutoff devices for power, data and fluid.

Further, as shown in FIG. 8, two power modules $12_3$ and $12_9$ are included in the upper row of the facility 10. These modules are shown additionally including extended solar panel assemblies $68_1$ and $68_2$ for generating electrical power for the entire facility 10. Two docking modules $12_2$ and $12_{12}$ are further shown at each end of the bottom row of modules and are used for coupling to launch and/or reentry vehicles, not shown. Two side by side attitude control modules are included in the upper row, and are designated $12_5$ and $12_7$. Adjacent the two attitude control modules $12_5$ and $12_7$ in the top row are two command and data handling modules $12_6$ and $12_8$ in the lower row and further illustrate antenna systems $80_1$ and $80_2$ being deployed therefrom. The antenna systems $70_1$ and $70_2$ are for communication between the ground and the space facility. Adjacent the command and data handling modules $12_6$ and $12_8$ and the outermost docking modules $12_2$ and $12_{12}$ are two robot system modules $12_4$ and $12_{10}$ which are adapted to not only store respective robotic arm assemblies $14_1$ and $14_2$ during launch or reentry to or from the facility 10 but also to house computer apparatus for controlling arm motion and translation. The same capability obtains for the command and data handling modules including the antennas $80_1$ and $80_2$ and the power modules which contain and later deploy the solar panels $68_1$ and $68_2$. The outermost modules $12_1$ and $12_{11}$ in the top row comprise single modules having selectively dedicated non-critical tasks such as the first module $12_1$ being designated an astronomy module, while the other module $12_{11}$ comprises a material processing and material storage module.

Figure 14:
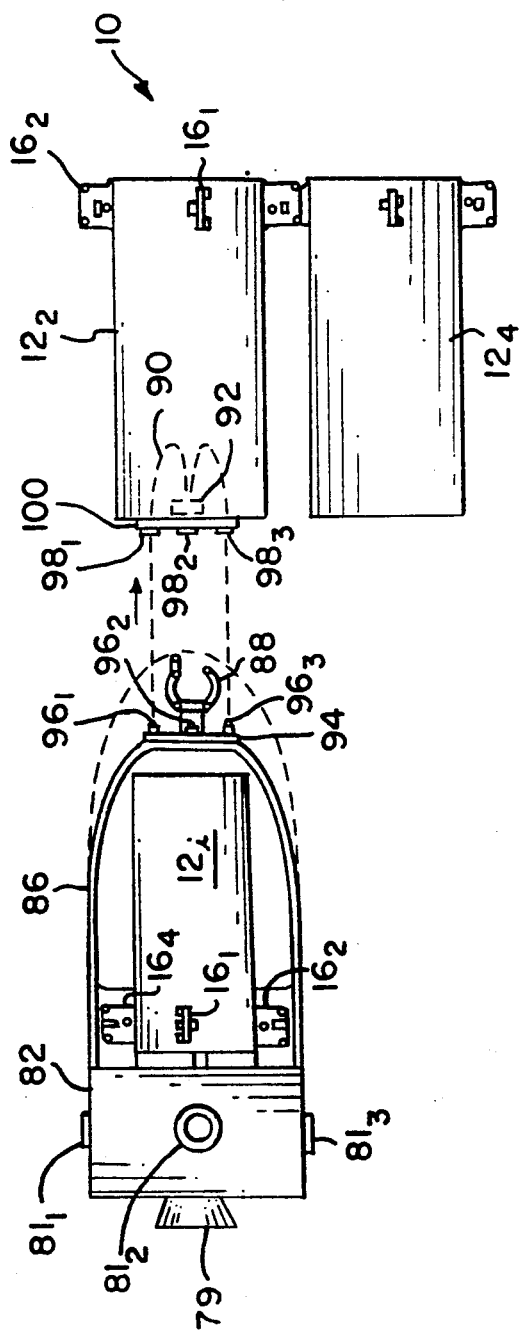
FIG. 14 is a mechanical schematic diagram illustrative of a delivery spacecraft and docking procedure for a module being delivered to the space facility shown in FIG. 1.
Figure 15:
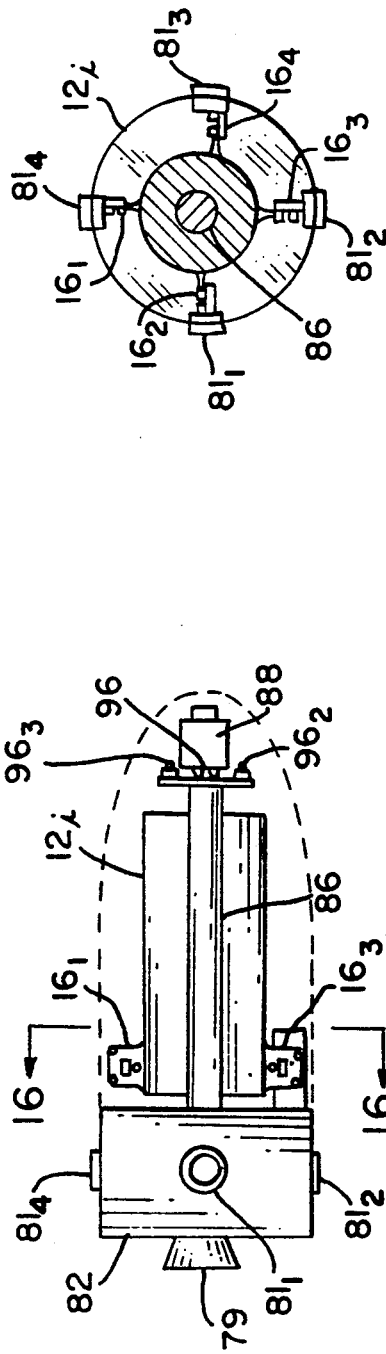
FIG. 15 is a mechanical schematic diagram further illustrative of the module delivery system shown in FIG. 14.
Figure 16:
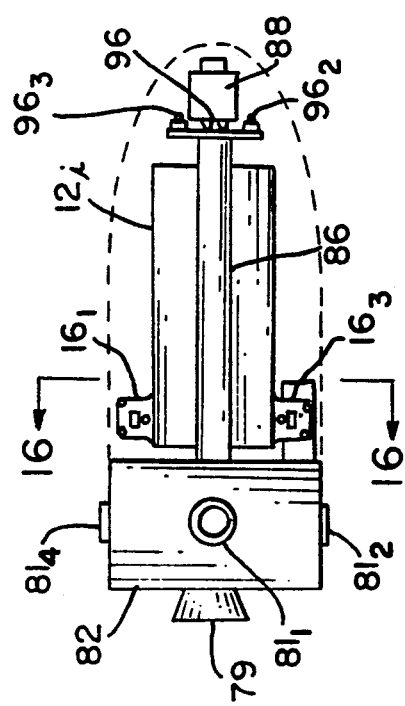
FIG. 16 is a cross-sectional view of the assembly shown in FIG. 15 taken along the lines 16—16 thereof.

Attention is now drawn to FIGS. 14 through 20, which is intended to illustrate how a module $12_i$ is delivered to the space facility 10 shown in FIG. 8 for assembly with another module already in space. As shown in FIG. 14, a launch vehicle 82 including propulsion and guidance means 79 and $81_1 \ldots 81_4$ with its exterior fairing 84 removed includes a forwardly located grapple support structure 86. This structure 86 is further shown in FIG. 15 and partially surrounding a module $12_i$. At the front of the grapple support structure 86 is a docking grapple mechanism 88 which is operable to engage a docking grapple fixture 90 located in one end of a docking module $12_2$ (FIG. 8).

The docking grapple mechanism 88 is adapted to enter the docking grapple fixture 90 where it engages an internal member 92. The docking grapple mechanism 88 is further shown mounted on a plate 94 which also includes three contact elements $96_1$, $96_2$ and $96_3$ which are adapted to contact complementary contact areas $98_1$, $98_2$, and $98_3$ affixed to a docking external plate 100 of the docking grapple fixture 90.

Figure 17:
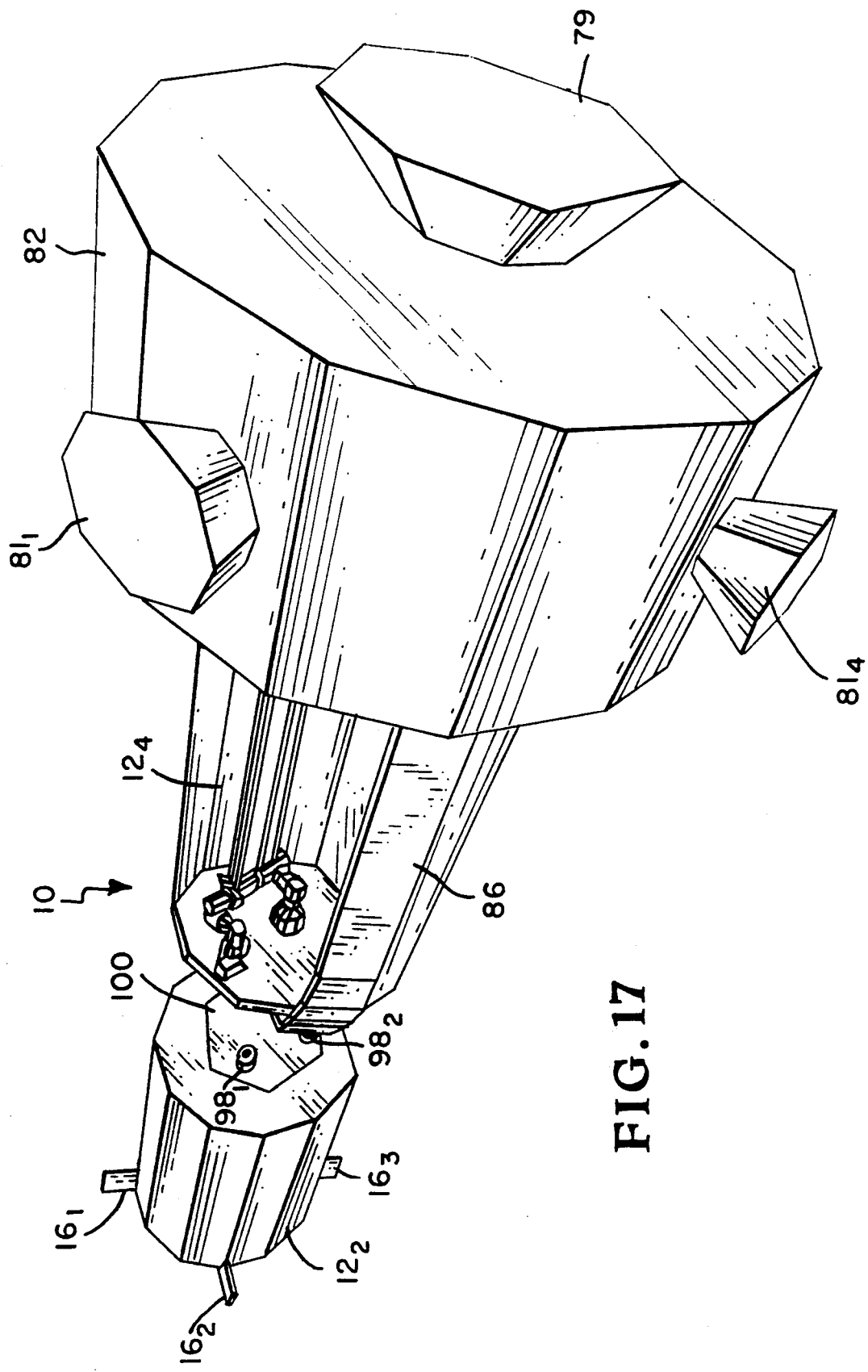
FIGS. 17-20 are perspective views illustrative of a launch vehicle delivering a robot to the facility shown in FIG. 8 and of the subsequent actions of the robot to position its module on the facility.
Figure 18:
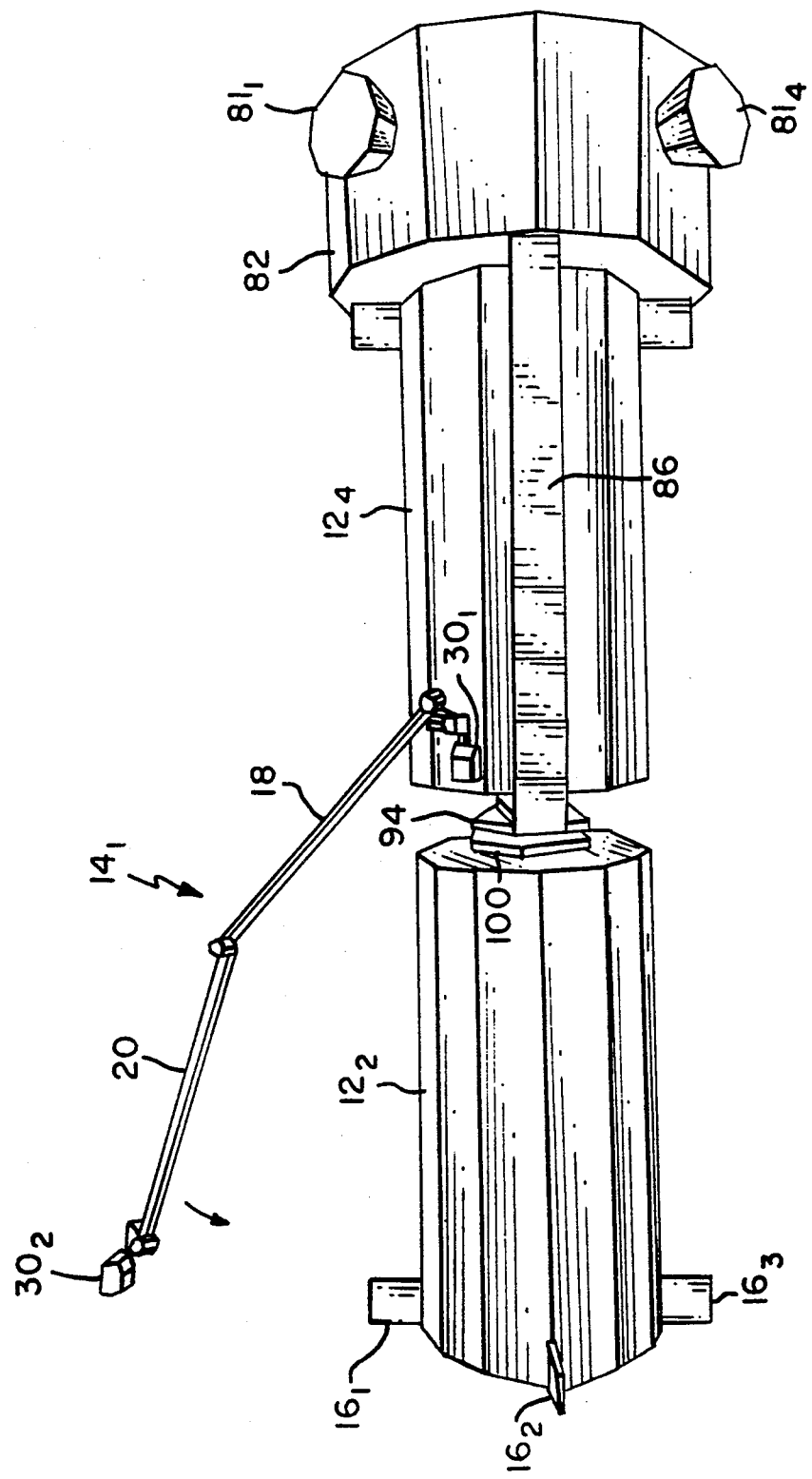
Figure 19:
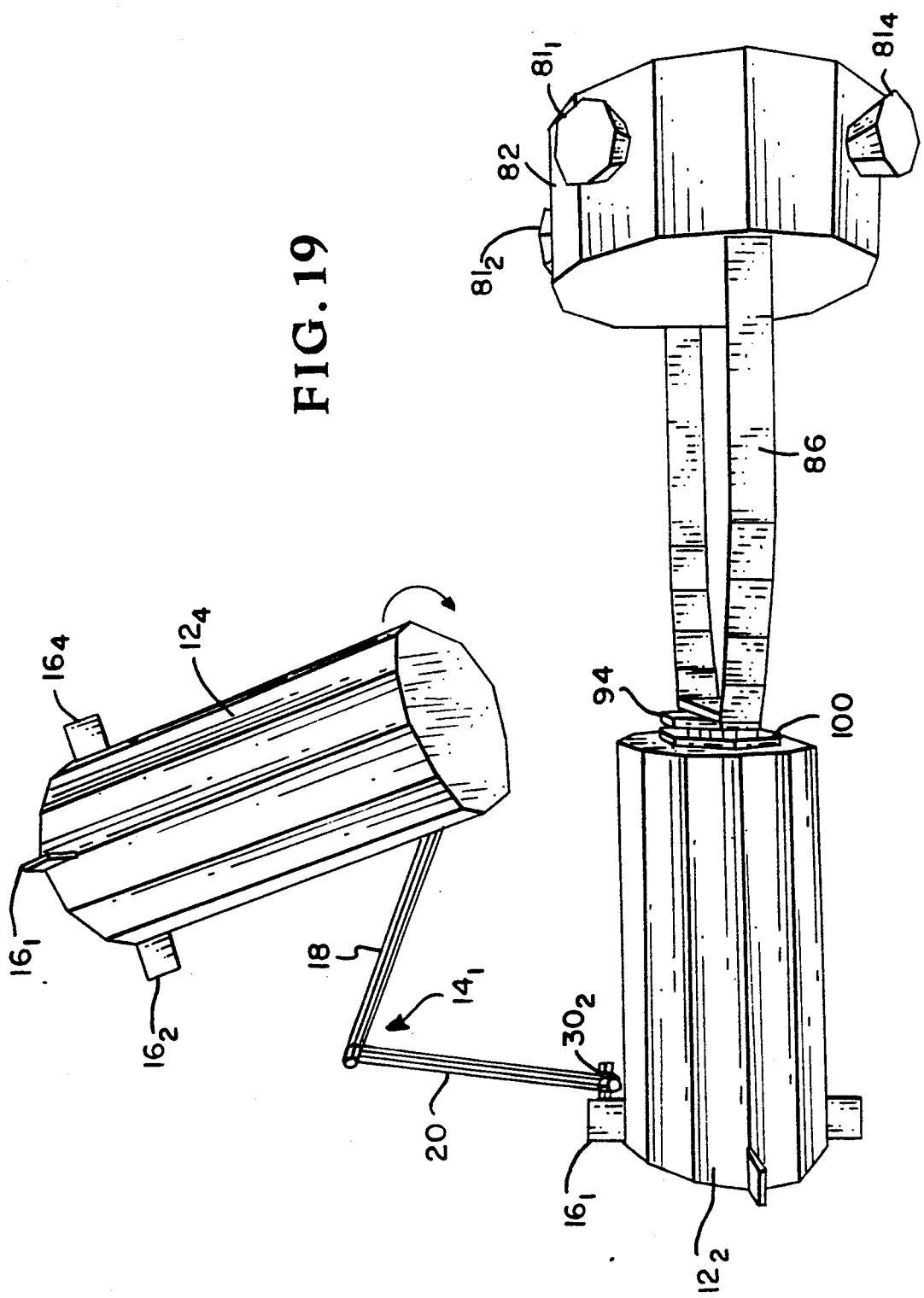
Figure 20:
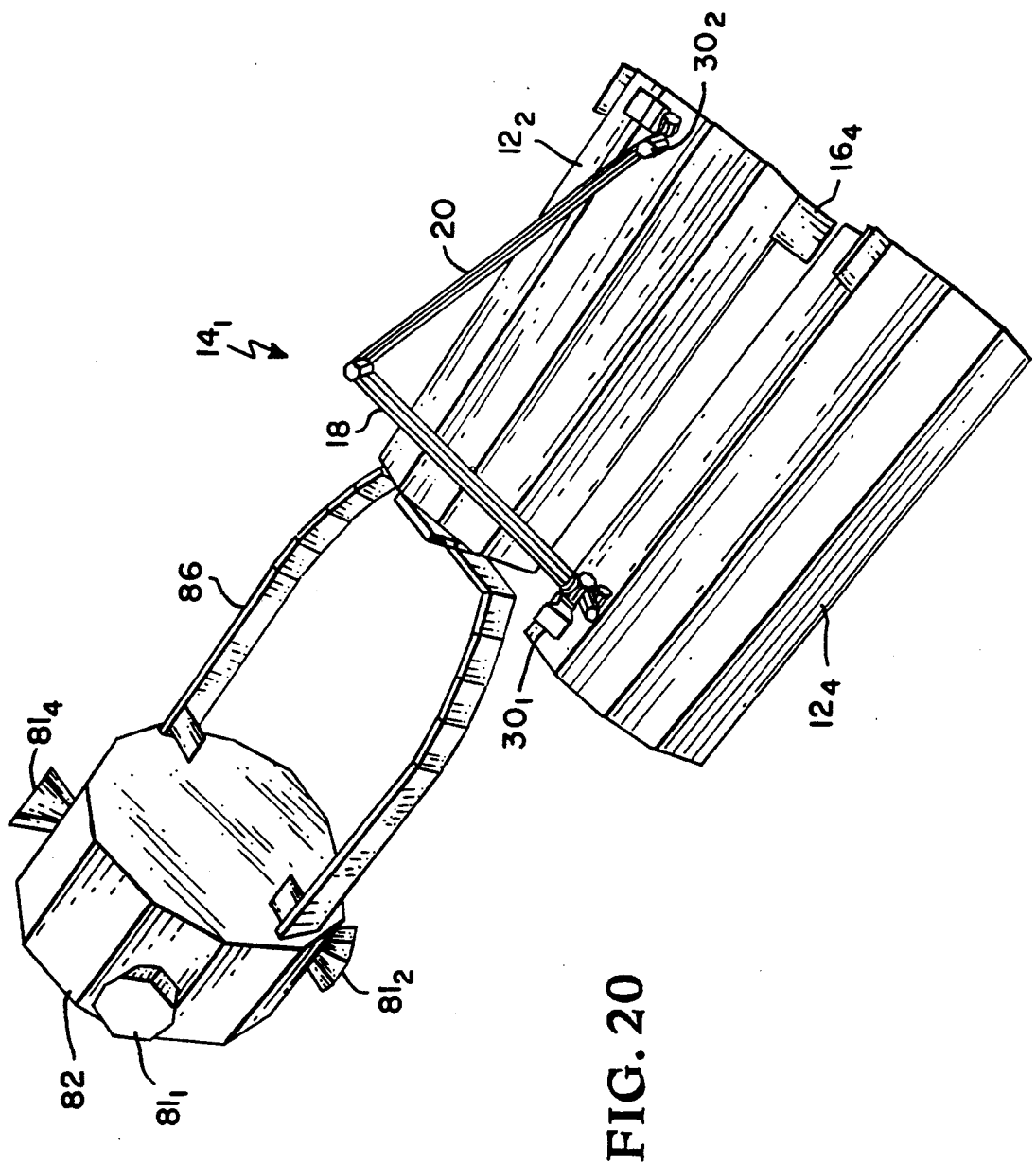

This now leads to a consideration of FIGS. 17 through 20. FIG. 17 discloses the first phase of a docking procedure whereby the launch vehicle 82, for example, delivers a robot systems module $12_4$ to the space facility 10. As shown, the grapple support structure 86 is aligned with the docking plate 100 of the docking grapple fixture 90 (FIG. 14). As shown in FIG. 18, upon completing a docking maneuver the two docking plates 94 and 100 abut one another. The robotic arm assembly $14_1$ stowed inside the module $12_4$ and being coupled thereto at one end via the flange assembly $30_1$ extends outwardly from its stowed position. The flange assembly $30_2$ at the end of the arm segment 20 is directed to the flange assembly $16_1$ of the docking module $12_2$. Following this, as shown in FIG. 19, the robotic arm assembly $14_1$ lifts the module $12_4$ from the grapple support structure 86 where it is then set in place beside the docking module $12_2$ and is connected to the flange assembly $16_1$.

Figure 13:
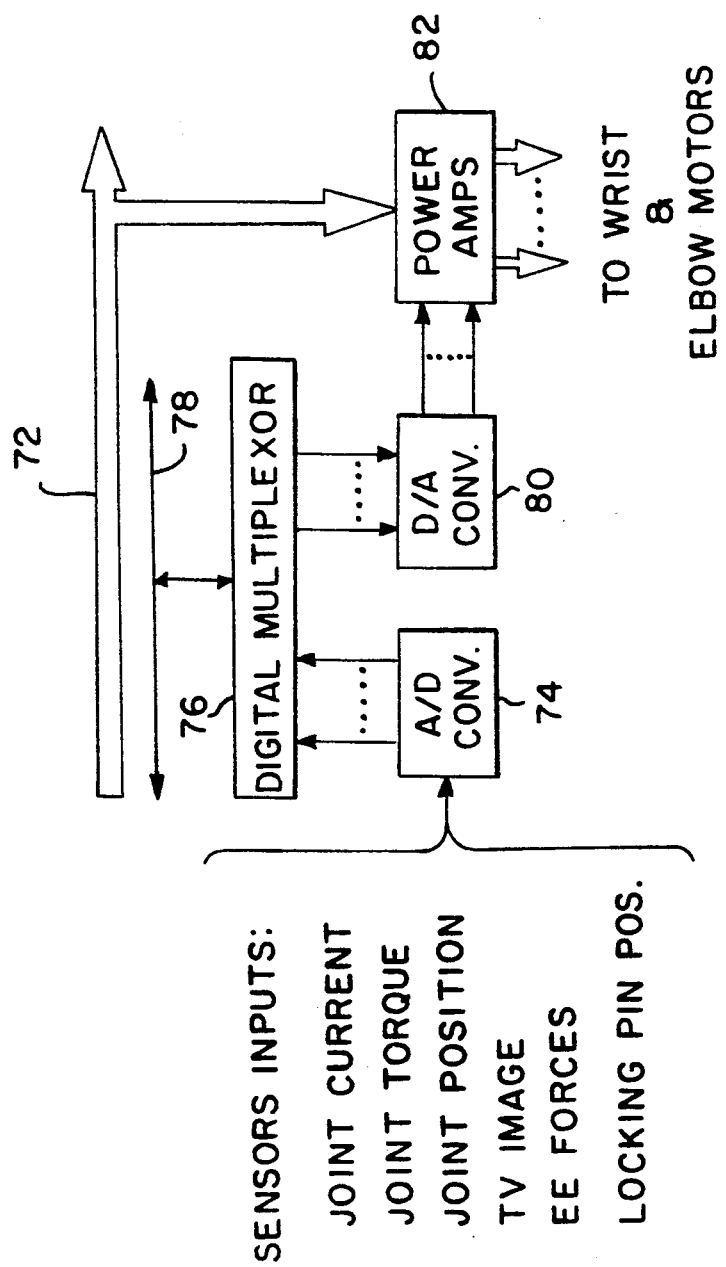
FIG. 13 is an electrical block diagram illustrative of the electrical circuitry included in the robotic arm shown in FIG. 15.

Considering now the operation and control of the robot, reference is now made to FIGS. 12 and 13, wherein the control architecture for a robotic arm assembly 14 is intended to be shown. As shown in FIG. 12, electric power is generated, for example, by the solar panel $68_2$ and stored in the power module $12_9$ and from which electrical power is distributed to the other modules $12_1 \ldots 12_{12}$, for example, via a power bus 72 which runs through the flange assemblies $16_1 \ldots 16_4$ and the connectors 64 and 66 shown in FIGS. 5 and 6 when connected together. In FIG. 12, the command and data handling module $12_8$ not only uses power from the bus 72, but also acts as a path by which electrical power reaches the robot control module $12_{10}$ where it is passed to the robot arm assembly 14 through flange assembly $16_3$, for example, where it connects to the robot end-effector apparatus $30_1$.

Figure 11:
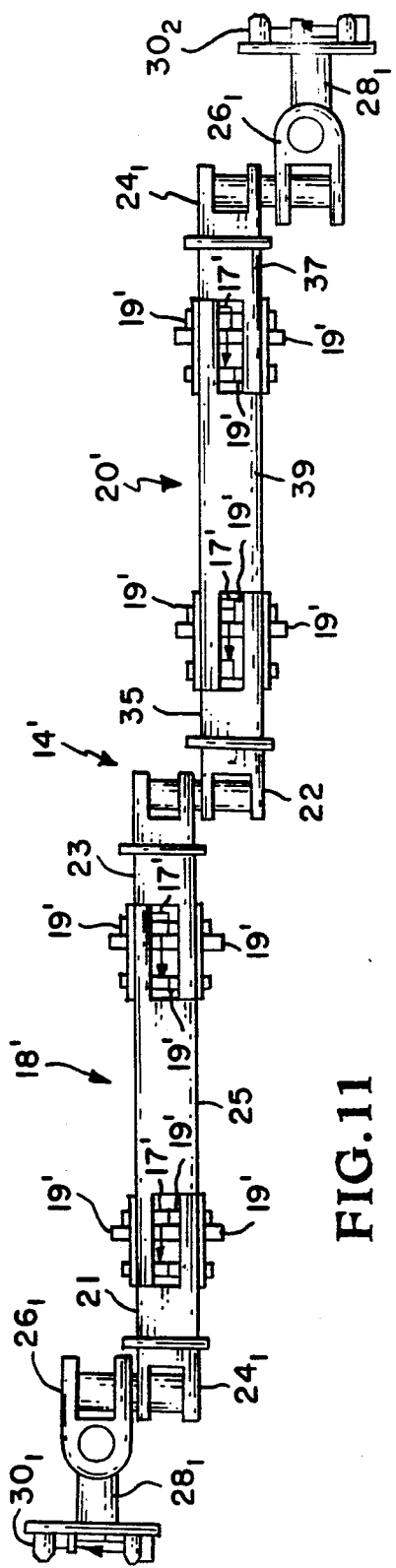
FIG. 11 is a top planar view of a modification of the robotic arm shown in FIG. 8.

It should be noted, however, that the robotic arm assembly 14 can access power and data from any available flange 16 attached to either end of the robot via end-effector apparatus $30_1$ or $30_2$. It will be recalled that as shown in FIGS. 1 and 2, each end of the robotic arm 14 includes three wrist joints $24_1$, $24_2 \ldots 28_1$, $28_2$. Now in addition to sensors the outer or distal joints $28_1$ and $28_2$ also includes a locking pin motor, not shown. The elbow joint 22 in addition to including an elbow motor, also includes joint position and torque sensors, not shown. Sensor outputs including joint current, joint torque, joint position, locking pin position as well as TV image signals, are fed to a set of analog to digital (A/D) converters 74 whose outputs are fed to a digital multiplexer 76 coupled to a bi-directional serial digital data bus 78, which may be, for example, a fiber optic data bus. The multiplexer is coupled to, among other things, a set of digital to analog (D/A) converters 80 whose outputs are coupled to respective drive motor power amplifiers 82 that are also connected to the power bus 72 for supplying motor currents to the wrist and elbow motors, not shown. If the robot arm were itself modularized, as shown in FIG. 11, there would be separate electronic assemblies as shown in FIG. 13 for each robot module.

Thus a ground station can transmit high level commands and data as necessary to the space facility 10 through an antenna $70_2$, for example, coupled to an active command and data handling module $12_8$. The command and data handling module $12_8$ includes computer apparatus which monitors and controls the overall facility 10, with the redundant feature being provided, if need be, by the other command and data handling module $12_6$ (FIG. 8). The robotic arm assemblies $14_1$ and $14_2$ also include computer apparatus located in their respective robot system modules $12_4$ and $12_{10}$ for handling each arm's control requirements. The operative command and data handling module, for example module $12_8$, first transmits to the computer apparatus in the robot control module $12_{10}$ a relatively high level command that informs it of a particular task which must be performed, for example, transferring a particular module $12_i$ from one location to another.

The robot control computer apparatus in the robot module $12_{10}$ then determines the specific steps required to perform the task, e.g. the module transfer, and generates a sequence of motor commands needed to execute these steps, all the while processing the data from the sensors that monitor robot operation and perform any needed feedback control of the robot based on sensor inputs which is processed in real time to provide accurate and reliable autonomous operations. As noted, these inputs include signals for the current, torque and position of each of seven joint motors, as well as TV camera signals for determining the position of the end-effector relative to the docking target and force/torque sensor data for determining contact forces during flange mating and demating.

The fiber optic data bus 78 shown in FIG. 13 permits serial high speed multiplex signal data transfer whereby analog sensor data being fed into the A/D converters 74 feed parallel digital data streams into the multiplexer 78, which then places them on the serial data bus 78 for transmission to a robot control computer, not shown, which then compares these data to their expected values and makes necessary judgments to the motor motion commands as necessary in response to greater than normal deviations in the sensor outputs. The normal or adjusted motion commands are sent out via the same serial bidirectional data bus 78 to the multiplexer where they are demultiplexed and transmitted to the D/A converters 80 which causes the motor power amplifiers 82 to vary the currents delivered to the respective motors.

Each robotic arm assembly $14_1$ and $14_2$ is designed for autonomous operation with ground control being optionally used to increase reliability by monitoring the operations and intervening when necessary. Certain design features are critical for autonomous operation. One basic design feature that enables autonomy is the robot compatible physical structure of the facility 10 itself which has been described earlier. With identically sized modules 12 having identically arranged flanges 16, the computer apparatus in the robot systems module $12_{10}$ or $12_4$ can utilize relatively simple look-up tables and algorithms to determine the location of any flange and the necessary intermediate steps required to move the robotic arm assembly 14 between any two of the flanges $16_1$–$16_n$. Because all flanges $16_1 \ldots 16_n$ are identical, all robot to flange mating operations utilize the same algorithm. The demating algorithm is very similar to the mating algorithm and can be used for all demating operations.

During mating and demating the robot arm goes through a series of control regimes. As long as the end-effector flange elements $30_1$ and $30_2$ of the robotic arm $14_1$ are far enough away from a mating flange $16_i$ so that there will be no chance of collision due to inaccuracies of preprogrammed robot motion, the robotic arm $14_1$ is in a preprogrammed trajectory mode wherein the robot control computer apparatus in the robot control module $12_4$, for example, moves the free end of the robotic arm $14_1$ from its safe clearance position relative to flange $16_i$ to which it was previously attached to the closest safe clearance distance relative to flange $16_i$ to which it is to be next attached. The computer apparatus monitors the motion of each wrist joint $24_1$, $24_2$, and $26_1$, $26_2$ and $28_1$ and $28_2$ to insure that the actual joint motions match those of the preprogrammed trajectory.

When a robot end-effector or mating flange $30_1$ or $30_2$ is less than the safe clearance from a flange $16_i$, but still not touching, the TV camera 60 (FIG. 6) views the alignment target 30 (FIG. 5) on the mating flange.

The image of alignment target 36 is digitized and sent to the robot control computer in the robot control module $12_{10}$ which calculates the position of the robot end-effector $30_1$, $30_2$ relative to the flange assembly $16_i$. This relative position data is used to generate wrist motor commands necessary to bring the robot locking pin roller 48 of the end-effector $30_1$ or $30_2$ within the capture range of and into contact with the guides on the pin roller assembly 37 of the flange.

Contact between the end-effector $30_1$ and $30_2$ and the alignment guides of the flange $16_i$ is detected by the six-vector force torque sensor 49, mounted beneath the locking pin roller 48 on the end-effector. If any torques or side forces are significant, the robot control computer apparatus will move the end-effector to reduce the forces to acceptable levels. When the correct final mating position is reached, electrical circuits 51 in the side supports of locking pin roller 48 will be closed by contact pins 53 located on the base of pin roller assembly 34. This closure, along with confirming data from the TV camera and robot joint position sensors, will indicate that a final mating position is reached and robot motion will then be commanded to cease.

The robotic arm 14' will then activate the locking mechanism motor 55 shown in FIG. 6, which will bring the lead screw/locking pin 54 in the electrical connectors 64 and 66 into contact. The computing apparatus will stop the motor 55 when a sensor, not shown, for axial forces on the locking pin 54 generates a reading equal to some predetermined value. This will indicate that the locking pin 54 is fully engaged. As noted above, the structural regularity of the shape of the modules $12_1 \ldots 12_n$ and their flange assemblies $16_1 \ldots 16_n$ permits all standard robot operations to be implemented by repetitions of a small number of unique steps. Each of these steps is sufficiently simple that they can be controlled with present technology for autonomous robots.

The following example of how a critical module failure would be handled is also significant in the present invention. Control computer apparatus in one of the command and data handling modules $12_6$ and $12_8$ of FIG. 8 detects the failure of one of the modules which may be, for example, the failure of robotic arm $14_1$ to accomplish some intended operation. The command and data handling module $12_6$, for example, notifies ground control of the robotic arm failure. Assuming that back-up procedures are available from the ground for implementing incremental manual move, the crippled robot arm can be made to fold itself into its module $12_4$, using robot arm $14_2$, for example, for assistance. The command and data handling module $12_6$ then deactivates and, by commanding various cutoff devices 71 shown in FIG. 28, isolates the robot module $12_4$ from any power and data being passed through adjacent modules $12_2$, $12_3$ and $12_6$ and routes needed power, data and fluid paths 67 around module $12_4$. Ground operations then prepare and launch a replacement robot module $12_4'$. Repeating the sequence shown in FIGS. 17–20, replacement robot module $12_4'$ is transferred from the launch vehicle and temporarily attached to a free flange $16_2$ on docking module $12_2$. The robot control computer in the robot module $12_4'$ will generate a sequence of motor commands that will move the faulty robot module $12_4$ to the docked launch vehicle, inserted therein, and thereafter cause module $124'$ to be moved to the position previously assigned to module $124$. Then the launch vehicle 82 will undock from the space facility 10 and performs a deorbit firing, returning the faulty module to earth. Assuming that the vehicle 82 is a reentry vehicle, then the failed robot module can be brought back to earth for refurbishment. If not, it and vehicle 82 are destroyed during reentry.

Figure 9:
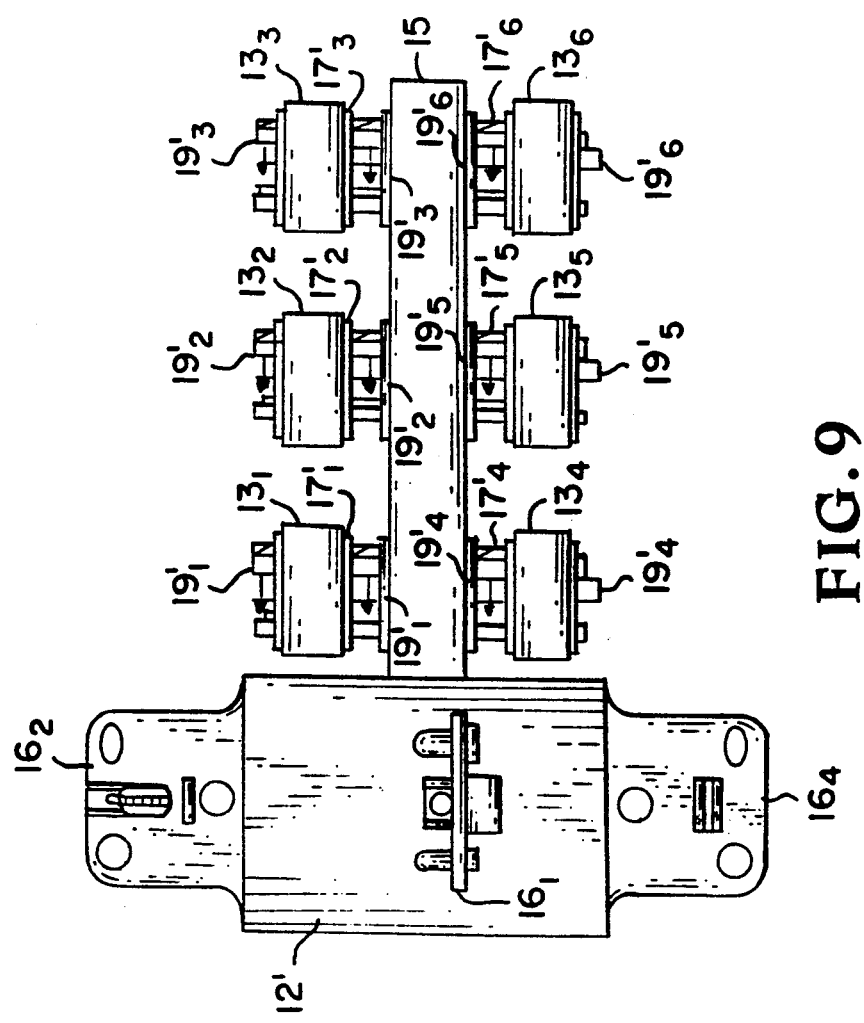
FIG. 9 is a top planar view of a modified module with six identical sub-modules attached thereto.

Considering now other physical configurations which can be utilized, reference is now made to FIG. 9, wherein there is depicted a module variation from the configuration of the plurality of modules $12_1 \ldots 12_n$. Shown is a module $12'$ having four orthogonally located flange assemblies, three of which are shown by reference numerals $16_1 \ldots 16_2$ and $16_4$. What is particularly significant about the module $12'$ is that it is designed to accommodate six sub-modules $13_1, 13_2 \ldots 13_6$ attached thereto and accordingly includes previously described female side type flange assemblies $19'_1, 19'_2 \ldots 19'_6$ on the outer side of the sub-module, while male side type flange assemblies $17'_1, 17'_2 \ldots 17'_3$ are included on the other side of the modules and which mate with female type flange assemblies $19'_1, 19'_2 \ldots 19'_6$ which are located on the outer surface of the module body 15. Thus the walker robot arm 14 can attach itself either to the flange assembly of the module $12'$ proper, or one of the sub-modules $13_1, 13_2 \ldots 13_6$ as required. Thus the submodules, as well as the modules, can be replaced by the walker robot 14.

Figure 10:
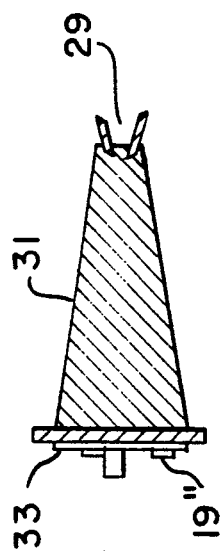
FIG. 10 is a schematic view generally illustrative of a detachable robot end-effector with a small gripper assembly at one end thereof.

Referring now to FIG. 10, shown thereat is a mechanical schematic diagram of a detachable robot end-effector 31 which is adapted to be coupled to one end flange assembly $30_1$ or $30_2$ of the robotic walker arm 14.

As shown in FIG. 11, depicted is a modified form of the robotic walker assembly 14 shown in FIGS. 1 and 3 and is indicated by reference numeral $14'$. The arm assembly $14'$ is in all other respects similar to the robotic arm 14 except for the construction of the two arm assemblies $18'$ and $20'$ which are shown comprised of three interconnected parts which are interconnectable via flange assemblies previously described. Accordingly, the arm portion $18'$ is comprised of relatively short end sections 21 and 23 and an intermediate section 25, which are intercoupled by means of male side end flange assemblies $17'$ and female side flange assemblies $19'$, it being noted that in each case there is always a female side type flange 19' on the outside. In a like manner, the arm member $20'$ is comprised of a pair of end sections 35 and 37 and an intermediate section 39 with like type male and female side flange assemblies $17'$ and $19'$, respectively. If used on robot $14_1$ and $14_2$ in FIG. 8, the robot design of FIG. 11 would allow one robot to service another through removal and replacement of robot modules. No additional tooling or fixturing would be required because the robot modules would have the same latching mechanisms as the facility modules.

Figure 21:
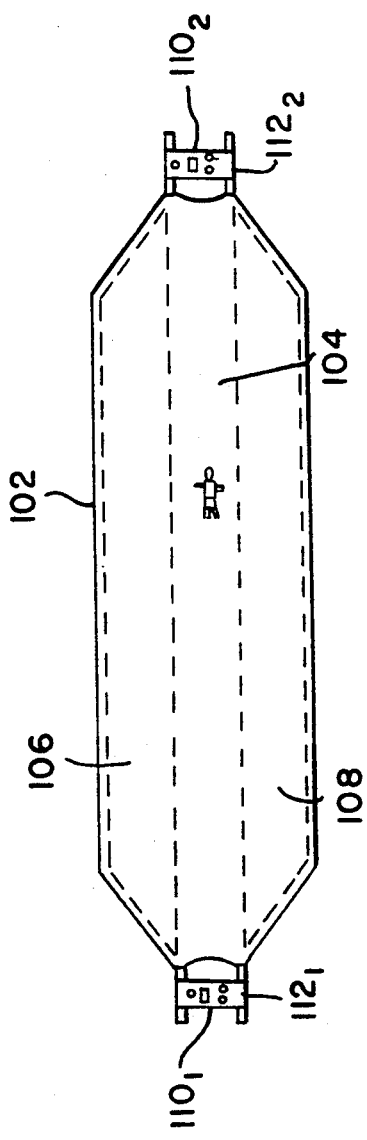
FIG. 21 is a top plan view of a manned space module in accordance with this invention.
Figure 22:
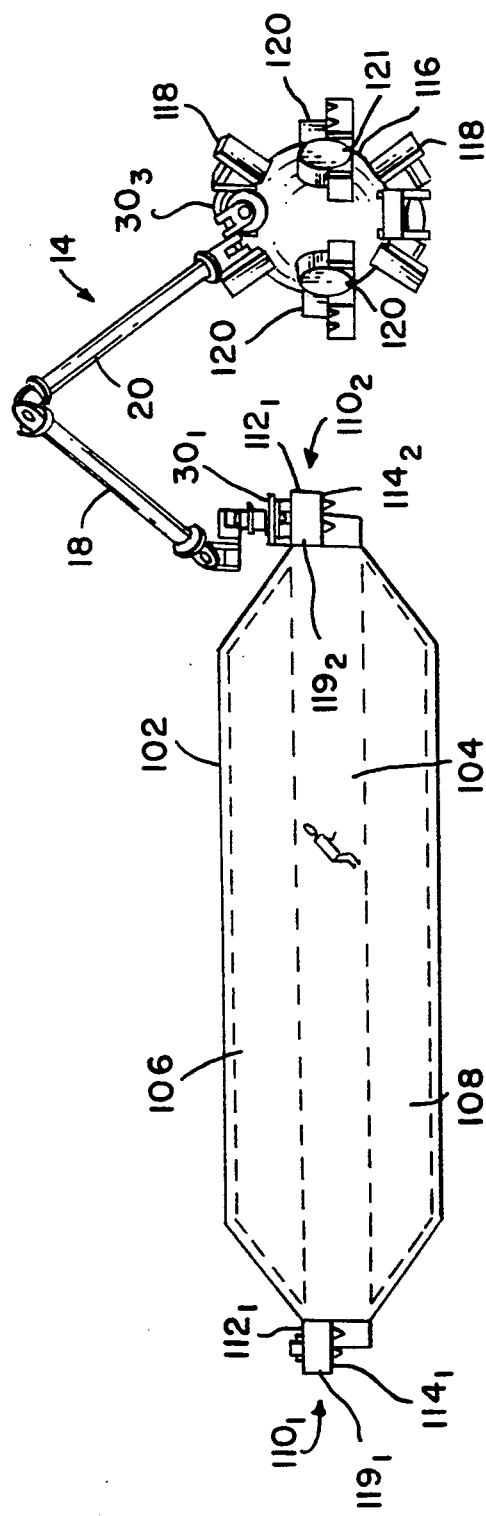
FIG. 22 is a side view of the manned module shown in FIG. 21 and having a robotic arm connected to a connecting node.
Figure 23:
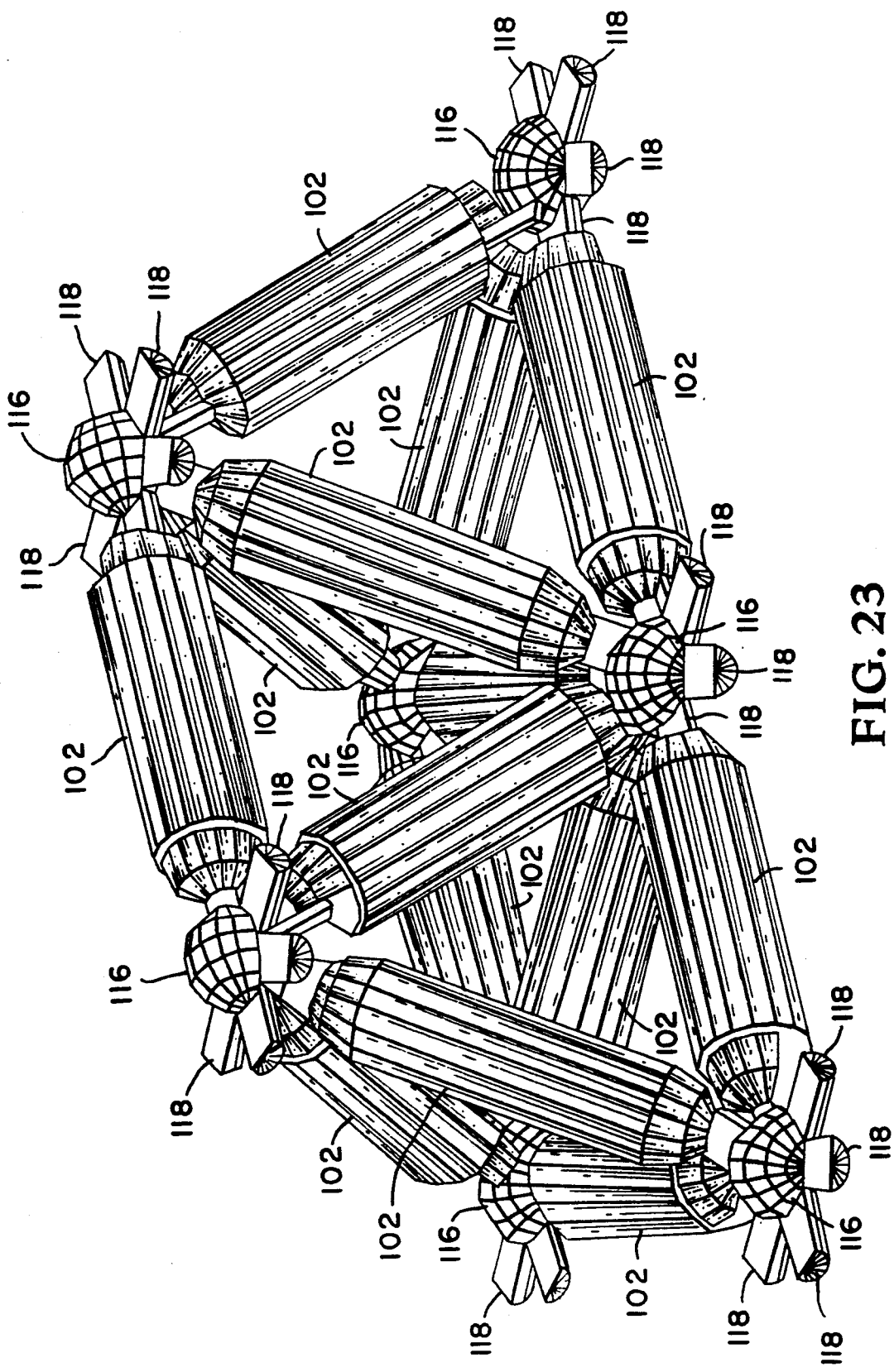
FIG. 23 is a perspective view generally illustrative of a cluster of manned modules shown in FIGS. 21-22.

Referring now to FIG. 21 wherein reference numeral 102 denotes an elongated module which narrows at the ends and has for its purpose being a manned module having a centralized passageway 104 and adjoining equipment storage areas 106 and 108 on either side thereof. At each end of the module 102 is an identical latch assembly $110_1$ and $110_2$ whose top surface portion $112_1$ and $112_2$ comprises a latching flange for coupling to a robotic arm assembly 14 as before, while the underside thereof as shown in FIG. 23 comprise a latch surface $114_1$ and $114_2$, which is adapted to engage a spherically shaped connecting node structure 116 which is shown in FIG. 22. The node structure 116 additionally includes a plurality of different type latch assemblies 118 and 120. Latch assemblies 118 are designed for coupling to one of the flange assemblies $30_1$ or $30_2$ of a robotic arm 14 as shown in FIG. 23, while the other latch assemblies 170 are adapted to mate with the latch structure $114_1$ or $114_2$ of the end flanges $110_1$ and $110_2$. Passageway joints, moreover, are included on the manned module 102 and the connecting node 116 as shown by reference numerals $119_1$, $119_2$ and 121, respectively, so that one may move from one manned module to another while a plurality of manned modules 102 are interconnected together by connecting nodes 116, as shown schematically, for example, in FIG. 23.

Figure 24:
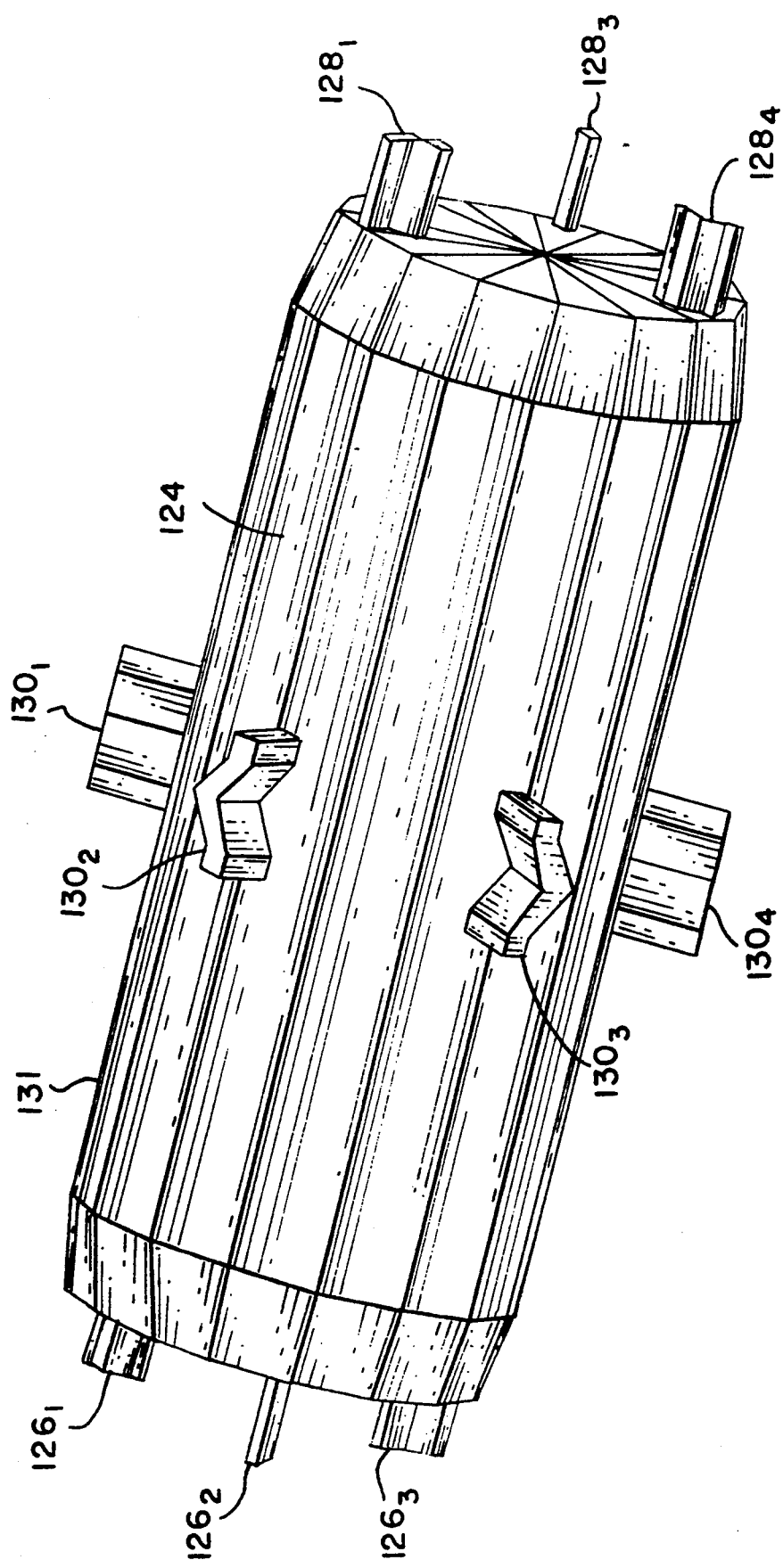
FIG. 24 is a perspective view generally illustrative of another type of space module which is connectable with identical type flange assemblies to construct a space facility in accordance with this invention.
Figure 25:
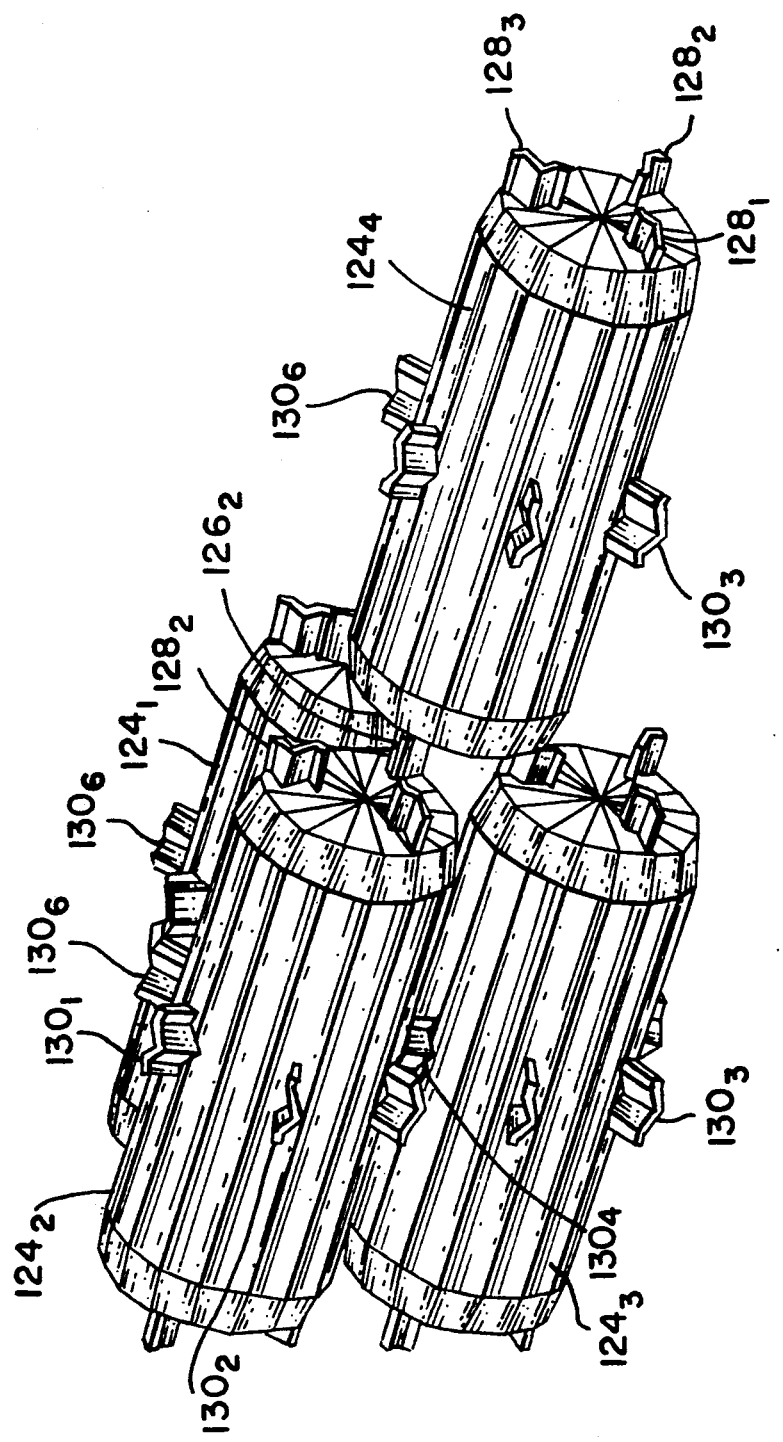
FIGS. 25 and 26 are perspective views of two variations of clusters of the space module shown in FIG. 24, in accordance with this invention.

Referring now to FIGS. 24 and 25, shown thereat is an alternate embodiment of the type of module shown in FIGS. 1 and 8 wherein instead of having one set of flanges $16_1 \ldots 16_4$, the module shown in FIG. 24 and identified by reference numeral 124 includes a set of three equally spaced connection flanges $126_1$, $126_2$ and $126_3$ located at end of the module and another set of three equally spaced flanges $128_1$, $128_2$ and $128_3$ located at the other end, and now additionally including a set of six equally spaced modules $130_1$, $130_2$, $130_3$ and $130_4$ with the flanges $130_5$ and $130_6$, not shown, which are located midway along the length of the module and being spaced at 60° increments around the outer surface 131 thereof. As shown in FIG. 25, a set of four modules $124_1$, $124_2$, $124_3$ and $124_4$ are linked together. The modules $124_1$, $124_2$ and $124_3$ are located side by side and being selectively coupled via mid flanges $130_1 \ldots 130_6$. The fourth module $124_4$ is connected end to end with module $124_2$ via mutually opposing end flanges $128_2$ and $126_2$, respectively.

Figure 26:
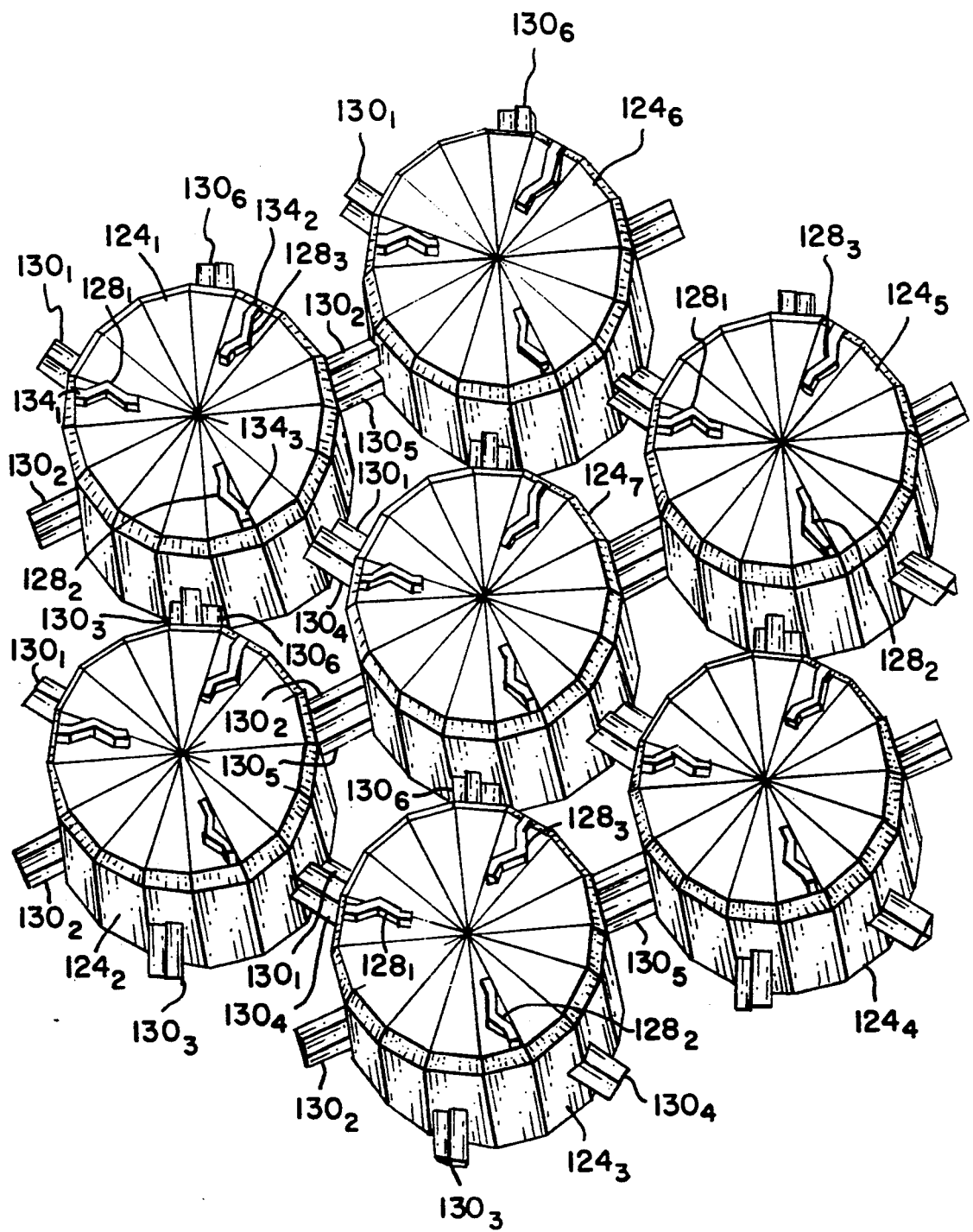

With respect to FIG. 26, shown thereat is an arrangement of seven interconnected modules $124_1, 124_2 \ldots 124_7$, of the type shown in FIG. 24. Moreover, each module $124_1 \ldots 124_7$ includes six equally spaced side surface flanges $130_1, 130_2 \ldots 130_6$ which are spaced at 60° intervals. Thus neighboring modules, for example module $124_1$, $124_2$ and $124_7$ are interconnected by side surface flanges $130_3$ and $130_7$ of modules $124_1$ and $124_2$, respectively, by flanges $130_5$ and $130_2$ of modules $124_2$ and $124_7$, respectively, and by flanges $130_4$ and $130_1$ of modules $124_1$ and $124_7$. This arrangement illustrates that the end flanges 126 and 128 do not need to be interconnected, if only one layer of modules 124 is used on a space facility. Thus a cluster of modules can be arranged which are not limited to a linear configuration as shown in FIG. 8.

All of the modules shown in FIGS. 21 through 26 share the characteristic that their latches are arranged in triangular patterns which potentially provide a better strength-to-weight ratio than the linear configuration shown in FIG. 8.

Figure 29:
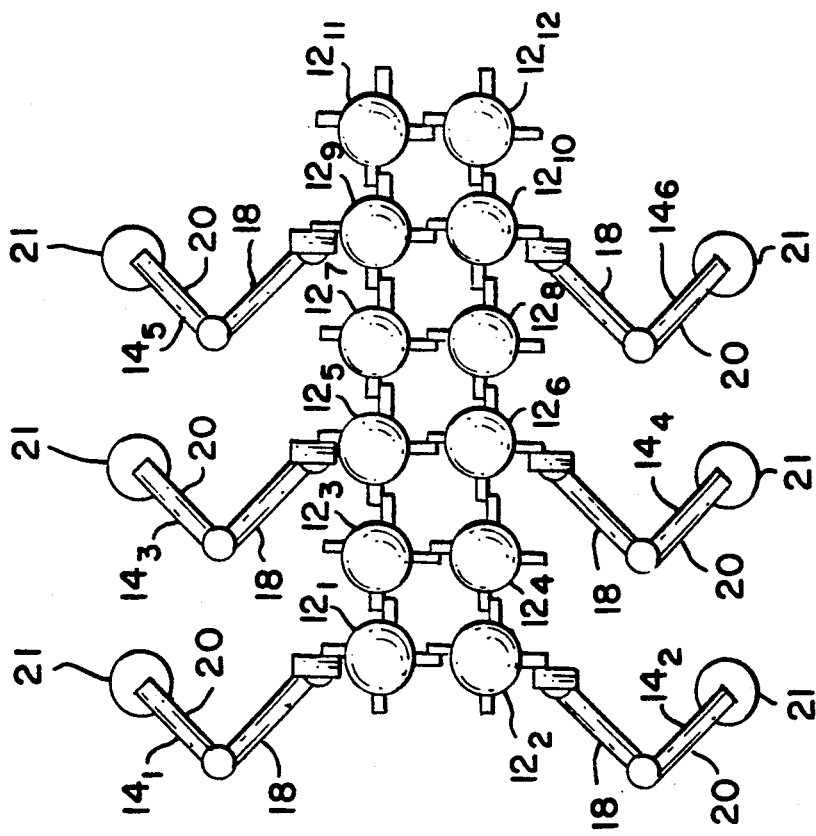
FIG. 29 is illustrative of the modular space facility equipped with strengthened robot arms with foot type end-effectors for use on a surface of a planetary body.

Referring now to FIG. 29, shown thereat is another variation of the application of the modules and robots is their application to a facility intended for use on the surface of a planetary body, not shown. In this application, a plurality of robotic arm assemblies $14_1 \ldots 14_6$ are strengthened, and fitted at their free ends with foot type end-effectors 21 so that they can serve as legs for static or mobile ground based facilities. The self-reconfiguring capabilities of the orbiting version of the space facility are still available. Module supply and return would be accomplished by a lander type vehicle which, after landing, would be approached by the mobile, ground based self-reconfiguring space facility in order to obtain new modules.

Additionally the thrusters associated with the attitude control system of the facility shown in FIG. 8 can be expanded, reconfigured and provided with large enough fuel supplies so that the space facility can function as a spaceship capable of accelerating from orbit about one planetary body, traveling to a second planetary body, and thereafter decelerating and going into orbit around the second body.

It will be appreciated that depending upon the physical shape of the module and the regular arrangement of flanges, any desired configuration can be designed. The only constraint is that each of the flange assemblies have one like side which comprises a male side, and one other like side which comprises a female side, such as described heretofore.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

I claim:

1. A robot serviced space facility capable of self-reconfiguration, comprising:
   a plurality of modules for performing predetermined functions at said facility, said modules each having a plurality of attachment means on an outer surface thereof, each said attachment means being comprised of first and second type complementary coupling apparatus whereby said first type apparatus on one of said modules couples to said second type apparatus of another of said modules to provide a transfer path between said modules for all structural loads, electrical power, data, fluids and the like,
   wherein said facility is comprised of said modules arranged in multiple interconnection rows to provide redundant critical modules and transfer paths so that any one said module of the facility can be removed without causing the loss of any vital functions of the facility,
   at least one robotic type manipulator apparatus comprised of at least first and second articulated members each including outer end sections having coupling apparatus compatible with one of said first and second types coupling apparatus of said modules for selective controlled attachment thereto,
   said manipulator apparatus being controlled so as to move in a walking type motion from one said module to another in a succession of alternate end section couplings to perform a predetermined task, said task including reconfiguring the space facility by detaching, transporting and attaching said modules without the need for assistance of control by local or remote human intervention,
   said attachment means comprises an outwardly extending flange assembly, and
   each said flange assembly comprises a two sided assembly having male type coupling means on one side and female coupling means on the other side.

2. The space facility of claim 1 wherein all of said modules comprise like shaped modules.

3. The space facility of claim 2 wherein said attachment means on each said module are regularly spaced.

4. The space facility of claim 1 wherein said first type coupling apparatus includes male type coupling means and said second coupling apparatus includes female type coupling means.

5. The space facility of claim 1 wherein said first and second articulated members are comprised of elongated arm members.

6. The space facility of claim 5 wherein said arm member includes common joint means having a single degree of freedom and wherein each of said outer end sections thereof include respective joint means having three degrees of freedom.

7. The space facility of claim 1 wherein said modules have internal computer controlled cutoffs so that paths taken by power, data and fluids can be controlled.

8. The space facility of claim 7 wherein the robotic manipulator apparatus includes two male type coupling means at one end so that walking between said modules can be accomplished without having to repeatedly connect and disconnect a transport module.

9. The space facility of claim 7 wherein at least one of said modules includes power thruster means for being used as an interplanetary spaceship.

10. The space facility of claim 1 wherein said compatible coupling apparatus of said manipulator selectively comprises male and female type coupling apparatus.

11. The space facility of claim 10 wherein each said male and female type coupling means additionally include complementary type fluid and electrical connector means for providing fluid paths and electrical power and signal paths between said modules and also said manipulator apparatus.

12. The space facility of claim 10 wherein each said male and female type coupling means additionally include mutually complementary abutment means.

13. The space facility of claim 10 wherein each said male type coupling means includes a locking pin roller assembly located thereon,
   said female type coupling means includes a pair of spaced apart locking pin roller assemblies located so as to straddle the locking pin roller assembly of said male type coupling means when said coupling means are positioned mutually adjacent each other, and
   said male type coupling means further includes a motor driven locking pin located adjacent to said locking pin assemblies and being operable to pass therethrough when energized to lock a pair of said coupling means in mutual engagement.

14. The space facility of claim 13 wherein said male type coupling means includes a first type fluid and electrical connector moved by said motor driven locking pin, and
   said female type coupling means includes a second type fluid and electrical connector mounted adjacent said pair of locking pin roller assemblies,
   said fluid and electrical connectors being brought together in contact when said motor driven locking pin is energized for providing fluid and electrical power and signal paths between modules.

15. The space facility of claim 10 wherein each said male and female type coupling means include mutually complementary alignment means.

16. The space facility of claim 15 wherein said alignment means includes an alignment target on one of said male and female type coupling means, and
   TV camera means on the other of said male and female type coupling means, and said alignment means also includes a six axis force torque sensor and electrical contacts on said male side locking pin roller assembly and contact pins between the spaced apart rollers of said female type coupling to close the electrical contacts.

17. The space facility of claim 10 wherein said plurality of flange assemblies comprises at least four flange assemblies orthogonally located on said outer surface of said modules.

18. The space facility of claim 17 wherein said four orthogonal flange assemblies are located at one end of said modules.

19. The space facility of claim 18 wherein the module includes a plurality of submodules attachable and detachable by a robot.

20. The space facility of claim 10 wherein said plurality of flange assemblies comprise equally spaced flange assemblies on said outer surface of said modules substantially midway of their length dimension.

21. The space facility of claim 10 wherein said modules include a pair of end surfaces having at least one flange assembly located on said end surfaces.

22. The space facility of claim 10 wherein said plurality of modules are arranged in at least a double row configuration.

23. The space facility of claim 22 wherein said plurality of modules include redundant pairs of predetermined types of control modules.

24. The space facility of claim 22 wherein one of said plurality of modules includes programmable computer apparatus for controlling said manipulator apparatus to perform said predetermined task.

25. The space facility of claim 22 wherein one of said plurality of modules includes a docking port having means being operable to mate and demate with a launch vehicle having a complementary docking fixture and capable of carrying a module from or to the ground.

26. The space facility of claim 25 wherein the launch vehicle carries a robot containing a module and permits the robot to exit the module after docking, attach itself to said space facility, transport said module form the launch vehicle to the space facility, and perform said operations in reverse so that the module and its contained robot transfer from the space facility to the docked vehicle top stage.

27. The space facility of claim 22 wherein one of said plurality of modules includes a module having containment means for a robot, out of which and into which said robot can transport itself.

28. The space facility of claim 27 wherein the robot transfers modules to and from the docked launch vehicle.

29. The space facility of claim 22 wherein one of the modules includes specialized end-effectors for the robot.

30. The space facility of claim 22 wherein the robot itself includes means interconnected by male and female type coupling means whereby one robot can replace the parts of a second robot.

31. The space facility of claim 10 wherein said plurality of flange assemblies comprises flange assemblies on modules and nodes including internal human passageways and means required to support human habitation.

32. The space facility of claim 31 wherein said modules and nodes can be attached to one another by a robot to create a manned space facility with interconnecting human passageways sealed from the outside environment and with transfer of power, data, fluids, and forces through all modules and nodes.

33. The space facility of claim 32 wherein the robot can also detach and transfer the modules and nodes about the facility as well as to and from a docked launch vehicle.

34. The space facility of claim 33 wherein said manipulator apparatus include foot type end-effectors so that the space facility can function as a fixed or mobile station on the surface of a planetary body.

* * * * *